United States Patent
Zhu et al.

(10) Patent No.: US 10,863,327 B2
(45) Date of Patent: Dec. 8, 2020

(54) ESTIMATION OF BUILDING FLOORS BASED ON DIFFERENCE IN BAROMETRIC PRESSURE MEASURED BY WIRELESS TERMINALS

(71) Applicant: Polaris Wireless, Inc., Mountain View, CA (US)

(72) Inventors: Jian Zhu, Tustin, CA (US); Jonathan Shiao-en Lu, San Jose, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 307 days.

(21) Appl. No.: 15/992,615

(22) Filed: May 30, 2018

(65) Prior Publication Data

US 2019/0313219 A1  Oct. 10, 2019

Related U.S. Application Data

(60) Provisional application No. 62/653,191, filed on Apr. 5, 2018.

(51) Int. Cl.
| | |
|---|---|
| *G01C 5/06* | (2006.01) |
| *H04W 4/33* | (2018.01) |
| *H04W 4/38* | (2018.01) |
| *H04W 4/021* | (2018.01) |

(52) U.S. Cl.
CPC .............. *H04W 4/33* (2018.02); *G01C 5/06* (2013.01); *H04W 4/021* (2013.01); *H04W 4/38* (2018.02)

(58) Field of Classification Search
CPC ...................................................... H04W 4/33
USPC ...................................................... 702/150
See application file for complete search history.

(56) References Cited

U.S. PATENT DOCUMENTS

| | | |
|---|---|---|
| 6,518,918 B1 | 2/2003 | Vannucci et al. |
| 6,944,465 B2 | 9/2005 | Spain et al. |
| 7,263,442 B2 | 8/2007 | Eckel |
| 7,433,695 B2 | 9/2008 | Gordon et al. |
| 8,938,210 B1 | 1/2015 | Otto et al. |

(Continued)

OTHER PUBLICATIONS

"Notice of Allowance, issued in parent U.S. Appl. No. 14/472,600", dated Sep. 25, 2015.
Andy Walker, "Natural Ventilation", "WBDG Whole Building Design Guide", Jun. 15, 2010, Publisher: National Institute of Building Sciences (2014), Published in: US.

(Continued)

*Primary Examiner* — Ricky Ngon
(74) *Attorney, Agent, or Firm* — McGeary Cukor, LLC; Kenneth Ottesen; Jason Paul DeMont

(57) ABSTRACT

A data-processing system that estimates the particular building floors that are present in a particular building based on differences in barometric pressure measurements provided by wireless terminals. A wireless terminal can report one or more barometric pressure measurements at the ground floor of a building and one or more pressure measurements at one or more above- or below-ground floors, or "non-ground" floors. The data-processing system receives the pressure measurements and uses the difference in the pressure measurements to determine a change in height between the ground floor and a non-ground floor. When the system collects enough data from many wireless terminals, it is able to identify the floors that are present in a particular building and their non-ground heights. Then, when an estimate of the vertical location of a wireless terminal is provided to a location application, the system is able to provide the estimate in terms of building floor.

19 Claims, 17 Drawing Sheets

(56) References Cited

U.S. PATENT DOCUMENTS

| | | | |
|---|---|---|---|
| 9,119,165 | B2 | 8/2015 | Krasner et al. |
| 9,237,423 | B1* | 1/2016 | Blaha, Jr. ............... H04W 4/025 |
| 9,794,755 | B1* | 10/2017 | South ......................... G01S 5/14 |
| 10,070,259 | B1* | 9/2018 | Ivanov ..................... G01C 5/06 |
| 2005/0272447 | A1 | 12/2005 | Eckel |
| 2010/0099433 | A1 | 4/2010 | Wigren |
| 2012/0290253 | A1 | 11/2012 | Barrett et al. |
| 2013/0035110 | A1 | 2/2013 | Sridhara et al. |
| 2013/0217410 | A1 | 8/2013 | Ku et al. |
| 2014/0135040 | A1 | 5/2014 | Edge et al. |
| 2014/0274151 | A1 | 9/2014 | Pattabiraman et al. |
| 2015/0133145 | A1 | 5/2015 | Palanki et al. |
| 2015/0233713 | A1 | 8/2015 | Wolf |
| 2015/0327010 | A1* | 11/2015 | Gottschalk ............ H04W 4/021 455/456.1 |
| 2015/0330780 | A1* | 11/2015 | Yuzawa ............... G01C 21/206 702/150 |
| 2017/0230802 | A1* | 8/2017 | Lakshmi Narayanan ................. H04W 4/021 |
| 2018/0206078 | A1* | 7/2018 | Venkatraman .......... H04W 4/33 |
| 2018/0352585 | A1* | 12/2018 | Yang ....................... H04W 4/30 |

OTHER PUBLICATIONS

"The Stack Effect: When Buildings Act Like Chimneys", "Green Building Advisor (http://www.greenbuildingadvisor.com)", 2013, Publisher: The Taunton Press, Inc., Published in: US.

Office action issued in U.S. Appl. No. 14/960,577, dated May 20, 2016.

CMHUI@HKU.HK, "Lecture: Air Movement and Natural Ventilation", Aug. 17, 2001, Publisher: The University of Hong Kong / Department of Agriculture (http://www.arch.hku.hk/), Published in: HK.

"Definition of 'Stack Effect'", "http://en.wikipedia.org/w/index.php?title=Stack_effect&oldid=601932011", , Publisher: Wikipedia, the free encyclopedia, Published in: US.

"Definition of 'Solar updraft tower'", "http://en.wikipedia.org/w/index.php?title=Solar_updraft_tower&oldid=612364746", , Publisher: Wikipedia, the free encyclopedia, Published in: US.

"Notice of Allowance" dated Jul. 8, 2016 in related U.S. Appl. No. 14/472,574.

Office action issued in U.S. Appl. No. 14/960,577, dated Feb. 2, 2016.

* cited by examiner

ESTIMATION OF BUILDING FLOORS BASED ON DIFFERENCE IN BAROMETRIC PRESSURE MEASURED BY WIRELESS TERMINALS

CROSS REFERENCE TO RELATED APPLICATIONS

The following document is incorporated by reference herein: U.S. Provisional Application Ser. No. 62/653,191, filed Apr. 5, 2018. If there are any contradictions or inconsistencies in language between this application and any document that has been incorporated by reference that might affect the interpretation of the claims in this application, the claims in this application should be interpreted to be consistent with the language in this application.

FIELD OF THE INVENTION

The present invention relates to telecommunications in general and, more particularly, to a technique for estimating the building floors that are present in a building based on differences in barometric pressure measurements provided by wireless terminals and using the building floor estimates to determine the vertical location of a wireless terminal.

BACKGROUND OF THE INVENTION

The salient advantage of wireless telecommunications over wireline telecommunications is that the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from signal measurements that are reported by the wireless terminal. The reported measurements are of signals measured by the wireless terminal that are transmitted by one or more base stations and, in some cases, by Global Navigation Satellite System (GNSS) satellites. In order for these techniques to work, at least some of the transmitted signals have to be strong enough to allow for accurate measurement by the wireless terminal and for reliable processing by the particular estimation technique. Some of these techniques work well even in environments where the measured strengths of the different signals vary significantly, such as where signal obstructions are present, including natural obstructions such as mountains and artificial obstructions such as buildings.

There are also techniques in the prior art for estimating the elevation of a wireless terminal. Some of these techniques rely on the relationship between atmospheric pressure, $P_A$, and elevation, $Z_A$, in which $P_A$ decreases logarithmically with $Z_A$, according to the formula:

$$Z_A = -H \ln\left(\frac{P_A}{P_0}\right) \quad \text{(Eq. 1)}$$

wherein
  $P_O$ is the reference atmospheric pressure, and
  H is the scale height of the atmosphere, which is the elevation at which the atmospheric pressure has decreased to $e^{-1}$ times its value at mean sea level (e.g., approximately 7000 meters).

It is well known in the prior art how to estimate the elevation of an object—such as an airplane—using Equation 1. Aircraft altimeters have used this technique for decades, and it is well known to be highly accurate. Furthermore, it is well known in the prior art how to estimate the elevation of a wireless terminal using Equation 1.

In order to obtain barometrically a good estimate of elevation (also known as a "z-estimate"), it is necessary to have both i) a good pressure measurement at the location for which the estimate of elevation is being determined and ii) a good pressure reference. The pressure reference can serve as an estimate of the sea-level pressure for a location of interest.

SUMMARY OF THE INVENTION

A wireless terminal that is capable of measuring barometric pressure can be used to provide pressure measurements for determining barometrically the terminal's elevation at its current position. For example, if a person who is in a tall building calls 9-1-1 to report a fire and the fire department attempts to locate the fire based on the location of the person's wireless terminal, the estimate of the location of the wireless terminal needs to be accurate. But estimating the elevation of something in a tall building in terms of standardized units of height (e.g., meters, feet) is only part of what is required. This is because emergency personnel need to know the vertical location in terms of the building floor, and merely knowing the elevation in height units is of limited help to the emergency personnel. Building floor information, however, is problematic to obtain, especially quickly; this is because public databases, on each and every building in regard to their building-floor configurations, typically do not exist. This is, of course, unacceptable and potentially life threatening.

The present invention enables the estimating of the particular building floors that are present in a particular building based on differences in barometric pressure measurements provided by wireless terminals and enables the estimating of the vertical location of a wireless terminal in terms of building floor. The inventors recognized that although a wireless terminal provides pressure measurements that are inaccurate, typically due to a measurement bias, those pressure measurements that are provided by the wireless terminal are consistently inaccurate, due to the measurement bias itself being consistent for at least a sufficient period of time (e.g., within a day, etc.). Consequently, such measurements can be used for the purpose of accurately and precisely determining a change in height, by using the difference of each pair of pressure measurements that are made at different heights. This is because the difference operation cancels out the source of the inaccuracy (i.e., the consistent measurement bias). After accounting for sources of error, the closeness of a change in height estimate derived from barometric pressure measurements can be within a few centimeters of the true value.

A wireless terminal can report one or more barometric pressure measurements at the ground floor of a building and also report one or more pressure measurements at one or more above- or below-ground floors, referred to herein as a "non-ground floor," such as the building floor on which the terminal's user works. A location engine of the illustrative embodiment receives the pressure measurements and uses the difference in the pressure measurements to determine a change in height between a ground floor and a non-ground floor. When the location engine uses pressure measurements from many wireless terminals within the same office building to determine changes in height, which can be represented as part of a histogram, distribution patterns begin to emerge amongst the histogram bins, which the location engine uses to identify the individual building floors.

For example, and according to the accumulated change-in-height data, many terminals might exhibit a seven-meter elevation change from ground floor to a first non-ground floor, while many others exhibit a ten-meter elevation change from ground floor to a second non-ground floor, while many others exhibit a thirteen-meter elevation change from ground floor to a third non-ground floor, and so on. In this example, it can be inferred that there is a three-meter difference between building floors after the first non-ground floor and that the first floor is above a lobby with a high ceiling.

When the location engine collects enough data in the manner described above, the location engine of the illustrative embodiment is able to identify the floors that are present in a particular building and at which non-ground heights. Then, when an estimate of the vertical location of a wireless terminal is to be provided to a location application (e.g., emergency services, etc.), the location engine is able to provide the estimate in terms of building floor, instead of, or in addition to, the elevation in height units (e.g., meters, feet, etc.).

In some embodiments of the present invention, the location engine can define a geofence according to a building that is being analyzed, such that a wireless terminal, which can be one of many, upon entering the geofenced area is made to report pressure measurements at a higher rate (e.g., every 5 seconds, etc.) than usual, and for a certain length of time (e.g., 5 minutes, etc.). This is to ensure that the wireless terminal has reached its destination within the building (e.g., its user's office, etc.) and has provided a sufficient number of pressure measurements on the destination floor as well as on the ground floor of the building. Also, the location engine can keep track of each particular building, out of multiple buildings, by comparing the latitude-longitude ("lat-lon") information of each wireless terminal with a geographic information system (GIS) database in which each building is defined.

Advantageously, the location engine of the illustrative embodiment does not require a calibrated barometer sensor in order to resolve the vertical location of something within a building to a particular building floor. Accordingly, the location engine does not require the pressure measurement bias of or the drift of a barometric sensor in a wireless terminal to be identified and compensated for.

An illustrative method of estimating the building floor of a first wireless terminal comprises: receiving, by a data processing system, a first series of M measurements of barometric pressure at a second wireless terminal, wherein at least some of the measurements in the first series are probative of the second wireless terminal being at a first elevation within a building; receiving, by the data processing system, a second series of N measurements of barometric pressure at the second wireless terminal, wherein at least some of the measurements in the second series are probative of the second wireless terminal being at a second elevation within the building; determining a first difference between i) a first pressure-related value that is derived from at least one of the measurements in the first series that are probative of the second wireless terminal being at the first elevation and ii) a second pressure-related value that is derived from at least one of the measurements in the second series that are probative of the second wireless terminal being at the second elevation; receiving, by the data processing system, a first measurement of barometric pressure at the first wireless terminal; generating an estimate of building floor on which the first wireless terminal is located, based on: (i) the first measurement of barometric pressure at the first wireless terminal, and (ii) the first difference; and transmitting the estimate of building floor to a location-based application system.

Another illustrative method of estimating the building floor of a first wireless terminal comprises: receiving, by a data processing system, a first series of M measurements of barometric pressure at a plurality of wireless terminals, wherein i) some of the measurements in the first series are probative of a second wireless terminal being at a first elevation within a building and ii) some of the measurements in the first series are probative of a third wireless terminal being at the first elevation within the building; receiving, by the data processing system, a second series of N measurements of barometric pressure at the plurality of wireless terminals, wherein i) at least some of the measurements in the second series are probative of the second wireless terminal being at a second elevation within the building and ii) at least some of the measurements in the second series are probative of the third wireless terminal being at the second elevation within the building, wherein the second elevation is unknown to the data processing system; determining a first difference between i) a first pressure-related value that is derived from at least one of the measurements in the first series that are probative of the second wireless terminal being at the first elevation and ii) a second pressure-related value that is derived from at least one of the measurements in the second series that are probative of the second wireless terminal being at the second elevation; determining a second difference between i) a third pressure-related value that is derived from at least one of the measurements in the first series that are probative of the third wireless terminal being at the first elevation and ii) a fourth pressure-related value that is derived from at least one of the measurements in the second series that are probative of the third wireless terminal being at the second elevation; receiving, by the data processing system, a first measurement of barometric pressure at the first wireless terminal; and generating an estimate of building floor on which the first wireless terminal is located, based on: (i) the first measurement of barometric pressure at the first wireless terminal, (ii) the first difference, and (iii) the second difference.

Yet another illustrative method of estimating the building floor of a first wireless terminal comprises: receiving, by a data processing system, a first series of M measurements of barometric pressure at a plurality of wireless terminals, wherein i) some of the measurements in the first series are probative of a second wireless terminal being at a first elevation within a building, ii) some of the measurements in the first series are probative of a third wireless terminal being at the first elevation within the building, and iii) some of the measurements in the first series are probative of a fourth wireless terminal being at the first elevation within the building; receiving, by the data processing system, a second series of N measurements of barometric pressure at the plurality of wireless terminals, wherein i) at least some of the measurements in the second series are probative of the second wireless terminal being at a second elevation within the building and ii) at least some of the measurements in the second series are probative of the third wireless terminal being at the second elevation within the building, wherein the second elevation is unknown to the data processing system; receiving, by the data processing system, a third series of P measurements of barometric pressure at the plurality of wireless terminals, wherein i) at least some of the measurements in the third series are probative of the fourth wireless terminal being at a third elevation within the building, wherein the third elevation is unknown to the data processing system; determining a first difference between i) a first pressure-related value that is derived from at least one of the measurements in the first series that are probative of the second wireless terminal being at the first elevation and ii) a second pressure-related value that is derived from at least one of the measurements in the second series that are probative of the second wireless terminal being at the second elevation; generating a second difference between i) a third pressure-related value that is derived from at least one of the measurements in the first series that are probative of the third wireless terminal being at the first elevation and ii) a fourth pressure-related value that is derived from at least one of the measurements in the second series that are probative of the third wireless terminal being at the second elevation; generating a third difference between i) a fifth pressure-related value that is derived from at least one of the measurements in the first series that are probative of the fourth wireless terminal being at the first elevation and ii) a sixth pressure-related value that is derived from at least one of the measurements in the third series that are probative of the fourth wireless terminal being at the third elevation; receiving, by the data processing system, a first measurement of barometric pressure at the first wireless terminal; and generating an estimate of building floor on which the first wireless terminal is located, based on: (i) the first measurement of barometric pressure at the first wireless terminal, (ii) the first difference, (iii) the second difference, and (iv) the third difference.

DEFINITIONS

Figure 1:
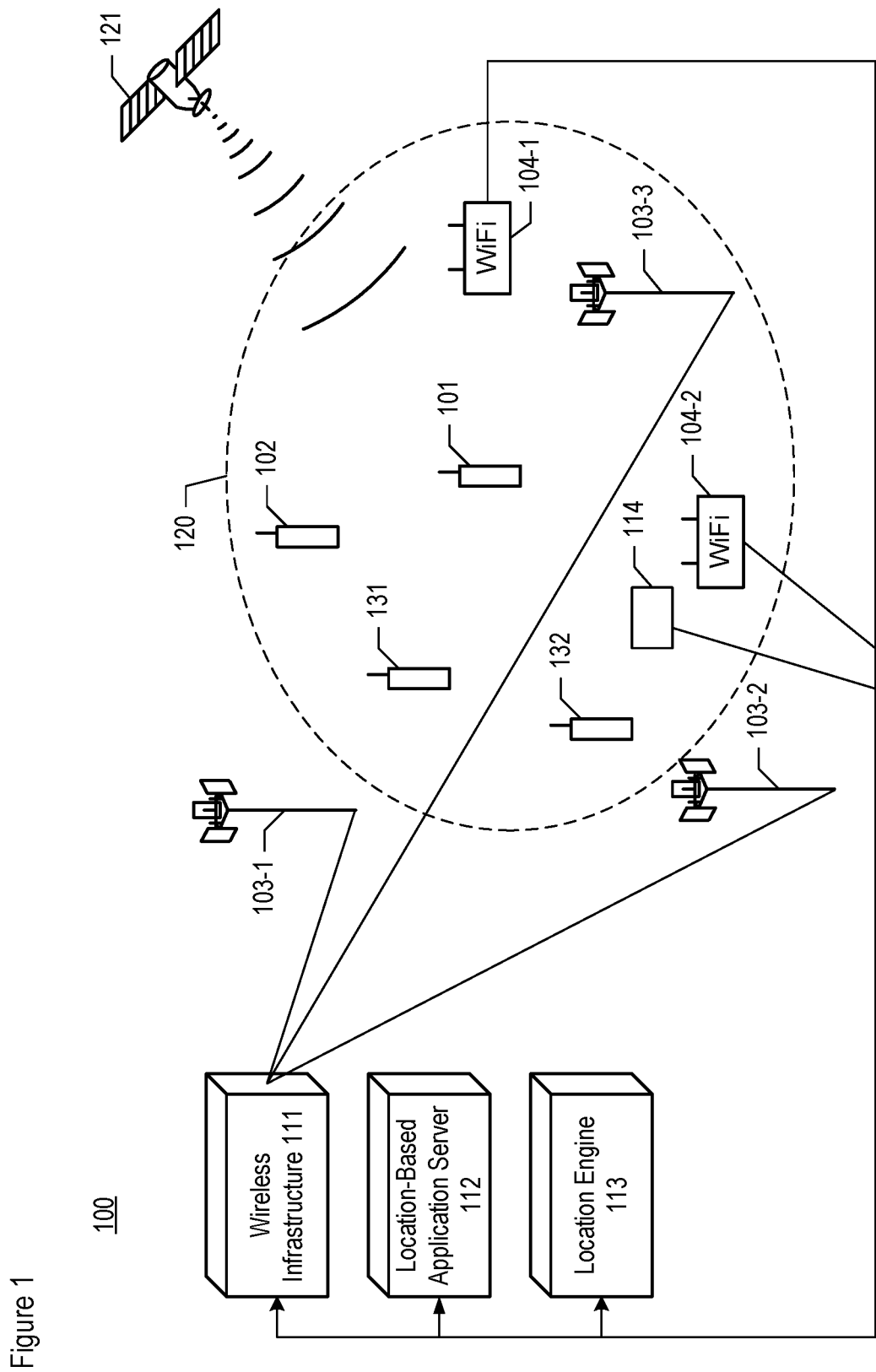
FIG. 1 depicts a diagram of the salient components of wireless telecommunications system 100 in accordance with the illustrative embodiment of the present invention.

Barometric Pressure—For the purposes of this specification, the term "barometric pressure" is defined as a pressure measured by a barometer. This pressure relates to atmospheric pressure, which is the force per unit area exerted on a surface by the weight of the air above that surface in the atmosphere of Earth.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Building Floor—For the purposes of this specification, the term "building floor" or "floor" is defined as all the rooms or areas on the same level (e.g., above-ground level, at-ground level, below-ground level, etc.) of a building or other type of built structure.

Derived from—For the purposes of this specification, the phrase "derived from" is defined as being obtained from one or more values using one or more mathematical functions on said values.

Elevation—For the purposes of this specification, the term "elevation" is defined as the height relative to a reference (e.g., mean sea level, ground level, etc.).

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Geofence—For the purposes of this specification, the term "geofence" is defined as a virtual perimeter for a geographic area.

Height—For the purposes of this specification, the term "height" should be given the ordinary and customary meaning that the term would have to a person of ordinary skill in the art at the time of the invention.

Identity of a Radio Signal—For the purposes of this specification, the phrase "identity of a radio signal" is defined as one or more indicia that distinguish one radio signal from another radio signal.

Lateral Location—For the purposes of this specification, a "lateral location" is defined as information that is probative of latitude or longitude or latitude and longitude.

Location—For the purposes of this specification, the term "location" is defined as a zero-dimensional point, a finite one-dimensional path segment, a finite two-dimensional surface area, or a finite three-dimensional volume.

Location-Dependent Information—For the purposes of this specification, the term "location-dependent information" is defined as information that varies with location. For example and without limitation, For example and without limitation, location-dependent information can be:
(i) a measurement of a location-dependent trait (e.g., signal strength, etc.) of a radio signal as received by the wireless terminal,
(ii) the identity of a radio signal as received by the wireless terminal (e.g., in a service environment in which different radio signals transmitted from different locations are assigned different identities, etc.), or
(iii) the identity (e.g., service set identifier [SSID], media access control [MAC] address, etc.) of the base station in communication with the wireless terminal (e.g., in a service environment in which different base stations at different locations are assigned different identities, etc.).

Location-Dependent Trait of a Radio Signal—For the purposes of this specification, the term "location-dependent trait of a radio signal" is defined as a characteristic of a radio signal that varies with:
(i) the location of the transmitter of the signal, or
(ii) the location of the receiver of the signal, or
(iii) both i and ii.
For example and without limitation, the amplitude and phase of a radio signal are generally location-dependent traits of the signal. In contrast, the frequency of a given radio signal is generally not a location-dependent trait of the signal.

Location-Trait Database—For the purposes of this specification, a "Location-Trait Database" is defined as a mapping that associates:
(i) one or more location-dependent traits of one or more radio signals received or transmitted by a wireless terminal, or
(ii) the identity of one or more radio signals received or transmitted by a wireless terminal, or
(iii) both i and ii,
at each of a plurality of locations.

Processor—For the purposes of this specification, a "processor" is defined as hardware or hardware and software that performs mathematical and/or logical operations.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, the term "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, wireless handset, a fixed or mobile subscriber unit, a pager, a cellular telephone, a personal digital assistant (PDA), an Internet of Things (IoT) device, a computer, and any other type of device capable of operating in a wireless environment are examples of wireless terminals.

DETAILED DESCRIPTION

Wireless Telecommunications System 100—

FIG. 1 depicts a diagram of the salient components of wireless telecommunications system 100 in accordance with the illustrative embodiment of the present invention. Wireless telecommunications system 100 comprises: wireless terminals 101, 102, 131, and 132, cellular base stations 103-1, 103-2, and 103-3, Wi-Fi base stations 104-1 and 104-2, wireless infrastructure 111, location-based application server 112, location engine 113, pressure reference 114, and Global Navigation Satellite System (GNSS) constellation 121, interrelated as shown.

Wireless infrastructure 111, location-based application server 112, location engine 113 (hereinafter "location engine 113"), and Wi-Fi base stations 104-1 and 104-2 are all connected to one or more interconnected computer networks (e.g., the Internet, a local-area network, a wide-area network, etc.) and, as such, can exchange data in well-known fashion.

Wireless terminals 101, 102, 131, and 132 are devices that provide bi-directional voice, data, and video telecommunications services to their respective users (not shown). The wireless terminals also perform the processes described below and in the accompanying figures, including measuring barometric pressure and providing pressure measurements. The wireless terminals comprise the hardware and software necessary to do the aforementioned tasks. Furthermore, the wireless terminals are mobile and can be at any location within geographic region 120 at any time.

Wireless terminals 101, 102, 131, and 132 provide the aforementioned telecommunications services to their respective users and perform the aforementioned tasks. It will, however, be clear to those skilled in the art, after reading this disclosure, how to make and use embodiments of the present invention in which the wireless terminals provide a different set of services or perform a different set of tasks.

In accordance with the illustrative embodiment, wireless terminals 101, 102, 131, and 132 can receive one or more radio signals from each of base stations 103-1, 103-2, and 103-3, Wi-Fi base stations 104-1 and 104-2, and Global Positioning System (GPS) GNSS constellation 121, in well-known fashion. The wireless terminals are also capable of identifying each radio signal it receives, in well-known fashion, and of transmitting the identity of each signal it receives to location engine 113. The wireless terminals are further capable of measuring one or more location-dependent traits of each radio signal they receive, in well-known fashion, and of transmitting each measurement they generate to location engine 113. And the wireless terminals also can measure a difference of a location-dependent trait of two signals they each receive, in well-known fashion, and of transmitting such measurements to location engine 113. As those who are skilled in the art will appreciate after reading this specification, the wireless terminals can use technologies other than WiFi and GPS GNSS for location purposes in some other embodiments of the present invention.

In accordance with the illustrative embodiment, 101, 102, 131, and 132 can transmit one or more radio signals—that can be received by one or more of base stations 103-1, 103-2, and 103-3 and Wi-Fi base stations 104-1 and 104-2—in accordance with specific parameters (e.g., MAC address, signal strength, frequency, coding, modulation, band, etc.), in well-known fashion, and of transmitting those parameters to location engine 113.

In accordance with the illustrative embodiment, and as described in detail below, wireless terminals 101, 102, 131, and 132 each comprise a barometer (shown in FIG. 2 as barometer 205). Accordingly, the wireless terminals are capable of measuring (e.g., periodically, sporadically, and on-demand) the barometric pressure, in well-known fashion, and of transmitting the measurements to location engine 113.

Although the illustrative embodiment depicts wireless telecommunications system 100 as comprising two wireless terminals, it will be clear to those skilled in the art, after reading this disclosure, how to make and use alternative embodiments of the present invention that comprise any number of wireless terminals.

Cellular base stations 103-1, 103-2, and 103-3 communicate with wireless infrastructure 111 via wireline and with wireless terminals 101, 102, 131, and 132 via radio in well-known fashion. As is well known to those skilled in the art, base stations are also commonly referred to by a variety of alternative names such as access points, nodes, network interfaces, etc. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 103-1, 103-2, and 103-3 are terrestrial and immobile, and base station 103-3 is situated within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 103-1, 103-2, and 103-3 comprise the hardware and software necessary to be Long-Term Evolution (LTE) 3GPP-compliant and to perform the processes described below and in the accompanying figures. In some alternative embodiments of the present invention, base stations 103-1, 103-2, and 103-3 communicate in accordance with a different cellular standard. Each of cellular base stations 103-1, 103-2, and 103-3 are capable of continually, for example and without limitation:

a. receiving one or more radio signals transmitted by wireless terminals 101, 102, 131, and 132, and
b. identifying each radio signal transmitted by the wireless terminals, in well-known fashion, and of transmitting the identity of those signals to location engine 113, and
c. measuring one or more location-dependent traits of each radio signal transmitted by the wireless terminals, in well-known fashion, and of transmitting the measurements to location engine 113, and
d. transmitting one or more signals to the wireless terminals in accordance with specific parameters (e.g., signal strength, frequency, coding, modulation, etc.), in well-known fashion, and of transmitting those parameters to location engine 113, and
e. broadcasting one or more signals that wireless terminals can use for various purposes (e.g., mobile assisted handoff, location determination, etc.).

It will be clear to those skilled in the art how to make and use cellular base stations 103-1, 103-2, and 103-3.

Wi-Fi base stations 104-1 and 104-2 communicate with wireless terminals 101, 102, 131, and 132 via radio in well-known fashion and in accordance with a WiFi protocol. In some alternative embodiments of the present invention, base stations 104-1 and 104-2 communicate in accordance with a different IEEE 802.11 standard or wireless LAN standard entirely. Wi-Fi base stations 104-1 and 104-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 104-1 and 104-2 are capable of continually performing one or more of:

a. receiving one or more radio signals transmitted by wireless terminals 101, 102, 131, and 132, and
b. identifying each radio signal transmitted by the wireless terminals, in well-known fashion, and of transmitting the identity of those signals to location engine 113, and
c. measuring one or more location-dependent traits of each radio signal transmitted by the wireless terminals, in well-known fashion, and of transmitting the measurements to location engine 113, and
d. transmitting one or more signals to the wireless terminals in accordance with specific parameters (e.g., signal strength, frequency, coding, modulation, etc.), in well-known fashion, and of transmitting those parameters to location engine 113, and
e. broadcasting one or more signals that wireless terminals can use for various purposes (e.g., mobile assisted handoff, location determination, etc.).

It will be clear to those skilled in the art how to make and use Wi-Fi base stations 104-1 and 104-2.

Wireless infrastructure 111 comprises a switch that orchestrates the provisioning of telecommunications service to wireless terminals 101, 102, 131, and 132 and the flow of information to and from location engine 113, as described below and in the accompanying figures. As is well known to those skilled in the art, wireless switches are also commonly referred to by other names such as mobile switching centers, mobile telephone switching offices, routers, and so on.

Location-based application server 112 comprises hardware and software that uses the estimate of the location of wireless terminals 101, 102, 131, and 132—generated by location engine 113—in a location-based application, in well-known fashion. Location-based applications are well known in the art and provide services such as and without limitation: E-911 routing, navigation, location-based advertising, weather alerts. In accordance with the illustrative embodiment, location-based application server 112 is implemented on a data-processing system made up of one or more server computers.

Figure 3:
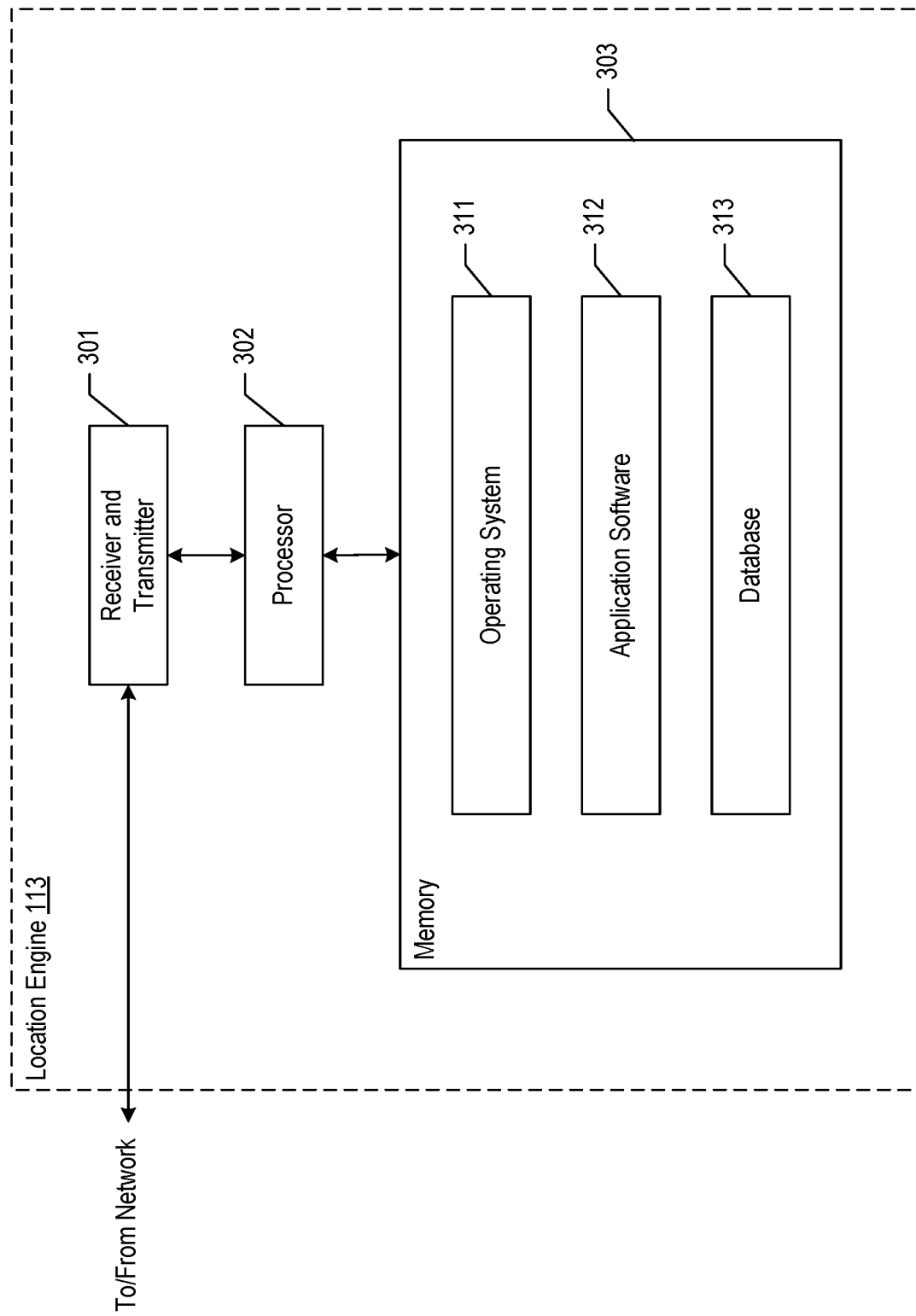
FIG. 3 depicts a block diagram of the salient components of location engine 113 of telecommunications system 100.

Location engine 113 is a data processing system that comprises hardware and software that generates one or more estimates of the locations of wireless terminals 101, 102, 131, and 132 as described below and in the accompanying figures. Location engine 113 is further capable of providing the building morphology estimation (e.g., building-floor estimation, etc.) as disclosed herein. In accordance with the illustrative embodiment, location engine 113 is implemented on a data-processing system made up of one or more server computers. It will be clear to those skilled in the art, after reading this disclosure, how to make and use location engine 113. Furthermore, although location engine 113 is depicted in FIG. 3 as physically distinct from wireless infrastructure 111, it will be clear to those skilled in the art, after reading this disclosure, how to make and use alternative embodiments of the present invention in which location engine 113 is wholly or partially integrated into wireless infrastructure 111. Location engine 113 comprises the location-trait database and geographic information system (GIS) databases, which are described in detail below.

Pressure reference 114 comprises hardware and software that continually measures the atmospheric pressure (i.e., provides a measurement of barometric pressure at an outdoor location), in well-known fashion, and transmits those measurements to location engine 113. Pressure reference 114 is at a known location in geographic region and known elevation, and measures barometric pressure at an outdoor location, thereby not being subject to any stack effect. In some embodiments of the present invention, pressure reference 114 is at a weather-reporting station, while in other embodiments reference 114 is at an airport station, while in still other embodiments reference 114 is at a different type of station (i.e., neither at an airport nor reporting the weather). Although the illustrative embodiment comprises only one pressure reference, it will be clear to those skilled in the art how to make and use alternative embodiments of the present invention that comprise any number of pressure references.

Wireless Terminal 101—

Figure 2:
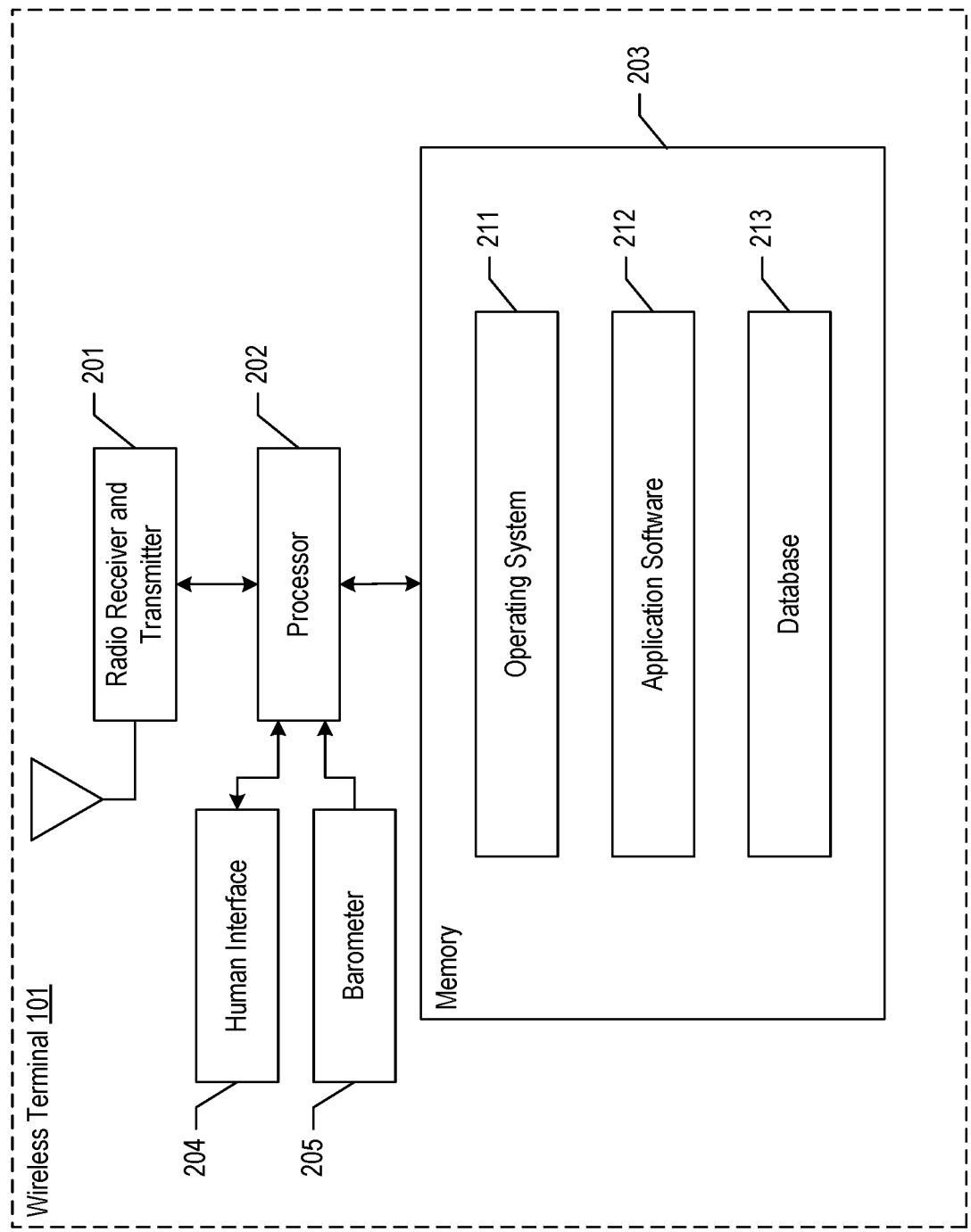
FIG. 2 depicts a block diagram of the salient components of wireless terminal 101 of telecommunications system 100.

FIG. 2 depicts a block diagram of the salient components of wireless terminal 101 in accordance with the illustrative embodiment of the present invention. Wireless terminal 101 comprises: radio receiver and transmitter 201, processor 202, memory 203, human interface 204, and barometer 205, interconnected as shown. The block diagram depicted in FIG. 2 can also be considered representative of wireless terminals 102, 131, 132, and other wireless terminals.

Radio receiver and transmitter 201 comprises hardware and software that enables wireless terminal 101 to receive (and analyze) radio signals and to transmit radio signals. In accordance with the illustrative embodiment, wireless telecommunications service is provided to wireless terminal 101 in accordance with both the Long-Term Evolution (LTE) 4G air-interface standard of the 3$^{rd}$ Generation Partnership Project ("3GPP") and the WiFi standard. After reading this disclosure, however, it will be clear to those skilled in the art how to make and use alternative embodiments of the present invention that operate in accordance with one or more other air-interface standards (e.g., a 5G or other standard under development, a different 4G standard, Global System Mobile "GSM," UMTS, CDMA-2000, IS-136 TDMA, IS-95 CDMA, 3G Wideband CDMA, other IEEE 802.11 or wireless LAN standard, 802.16 WiMax, Bluetooth, etc.) in one or more frequency bands. It will be clear to those skilled in the art how to make and use radio receiver and transmitter 201.

Processor 202 is hardware under the command of software stored in memory 203 that performs all of the relevant functions described below and in the accompanying figures. For example, processor 202 can execute an operating system, the application software that performs, among other things, operations 1111 through 1117 (described herein and shown in FIG. 11B), and of populating, amending, using, and managing a database comprising parameters that define one or more geofences, as described in detail below and in the accompanying figures. It will be clear to those skilled in the art how to make and use processor 202.

Memory 203 is a non-transitory, non-volatile random-access memory that holds all of the programming and data required for the operation of wireless terminal 101, and includes operating system 211, application software 212, and database 213. It will be clear to those skilled in the art how to make and use memory 203.

Human interface 204 is hardware and software that enables a person to interact with wireless terminal 101. Human interface 204 comprises a display, keypad, microphone, and speaker. It will be clear to those skilled in the art how to make and use human interface 204.

Barometer 205 is a barometric sensor device and comprises a hardware MEMS sensor that measures the atmospheric pressure at wireless terminal 101, thereby providing barometric pressure measurements. In accordance with the illustrative embodiment, barometer 205 comprises the LSP331AP MEMS pressure sensor from ST Microelectronics and/or the Bosch BMP280 sensor, but it will be clear those skilled in the art, after reading this disclosure, how to make and use alternative embodiments of the present invention that use a different sensor to measure the atmospheric pressure.

As those who are skilled in the art will appreciate, wireless terminal 101 can be equipped with one or more sensors that can measure temperature of and/or humidity in the environment. For example, the Bosch BMP280 chip is also capable of measuring temperature.

Wireless terminal 101 can perform at least some of the processes described below and in the accompanying figures. For example and without limitation, wireless terminal 101 is capable of:

a. receiving one or more radio signals transmitted by cellular base stations 103-1, 103-2, and 103-3, Wi-Fi base stations 104-1 and 104-2, and GNSS constellation 121, and b. identifying each radio signal transmitted by cellular base stations 103-1, 103-2, and 103-3, Wi-Fi base stations 104-1 and 104-2, and GNSS constellation 121, in well-known fashion, and of transmitting the identity of those signals to location engine 113, and c. measuring one or more location-dependent traits of each radio signal transmitted by cellular base stations 103-1, 103-2, and 103-3, Wi-Fi base stations 104-1 and 104-2, and GNSS constellation 121, in well-known fashion, and of transmitting the measurements to location engine 113, and d. transmitting one or more signals to cellular base stations 103-1, 103-2, and 103-3, Wi-Fi base stations 104-1 and 104-2 in accordance with specific parameters (e.g., signal strength, frequency, coding, modulation, etc.), in well-known fashion, and of transmitting those parameters to location engine 113, and e. measuring the barometric pressure at wireless terminal 101, in well-known fashion, and transmitting those measurements to location engine 113. In some embodiments of the present invention, wireless terminal can measure the temperature and/or humidity at wireless terminal 101, in well-known fashion, and transmit those measurements to location engine 113.

It will be clear to those skilled in the art how to make and use wireless terminal 101 and, by extension, wireless terminals 102, 131, and 132.

Location Engine 113—

FIG. 3 depicts a block diagram of the salient components of location engine 113 in accordance with the illustrative embodiment. Location engine 113 comprises: receiver and transmitter 301, processor 302, and memory 303, which are interconnected as shown.

Receiver and transmitter 301 enables location engine 113 to transmit to and receive from wireless terminals 101, 102, 131, and 132, wireless infrastructure 111, location-based application server 112, pressure reference 114, and Wi-Fi base stations 104-1 and 104-2, in well-known fashion. It will be clear to those skilled in the art how to make and use receiver and transmitter 301.

Processor 302 is a general-purpose processor that can execute an operating system, the application software that performs operations 401 through 413 (described herein and shown in FIG. 4), and of populating, amending, using, and managing a location-trait database, a GIS database, and a building-floor database, as described in detail below and in the accompanying figures. It will be clear to those skilled in the art how to make and use processor 302.

In general, the location-trait database contains information for the possible locations of a wireless terminal and the identity and location-dependent traits of radio signals as if the wireless terminal were at each of those locations. It will be clear to those skilled in the art how to make and use the location-trait database.

In general, the GIS database contains information for geographic region 120, including without limitation, the physical characteristics of all of the structures in geographic region 120. It will be clear to those skilled in the art how to make and use the GIS database.

In general, the building-floor database contains information for one or more buildings, including without limitation, the estimated building floors for buildings 602 and 604. It will be clear to those skilled in the art, after reading this specification, how to make and use the building-floor database.

Memory 303 is a non-transitory, non-volatile memory that stores:
  a. operating system 311, and
  b. application software 312, and
  c. the location-trait database in database 313, and
  d. the GIS database in database 313, and
  e. the building-floor database in database 313.

It will be clear to those skilled in the art how to make and use memory 303.

Operation of the Illustrative Embodiment

Figure 4:
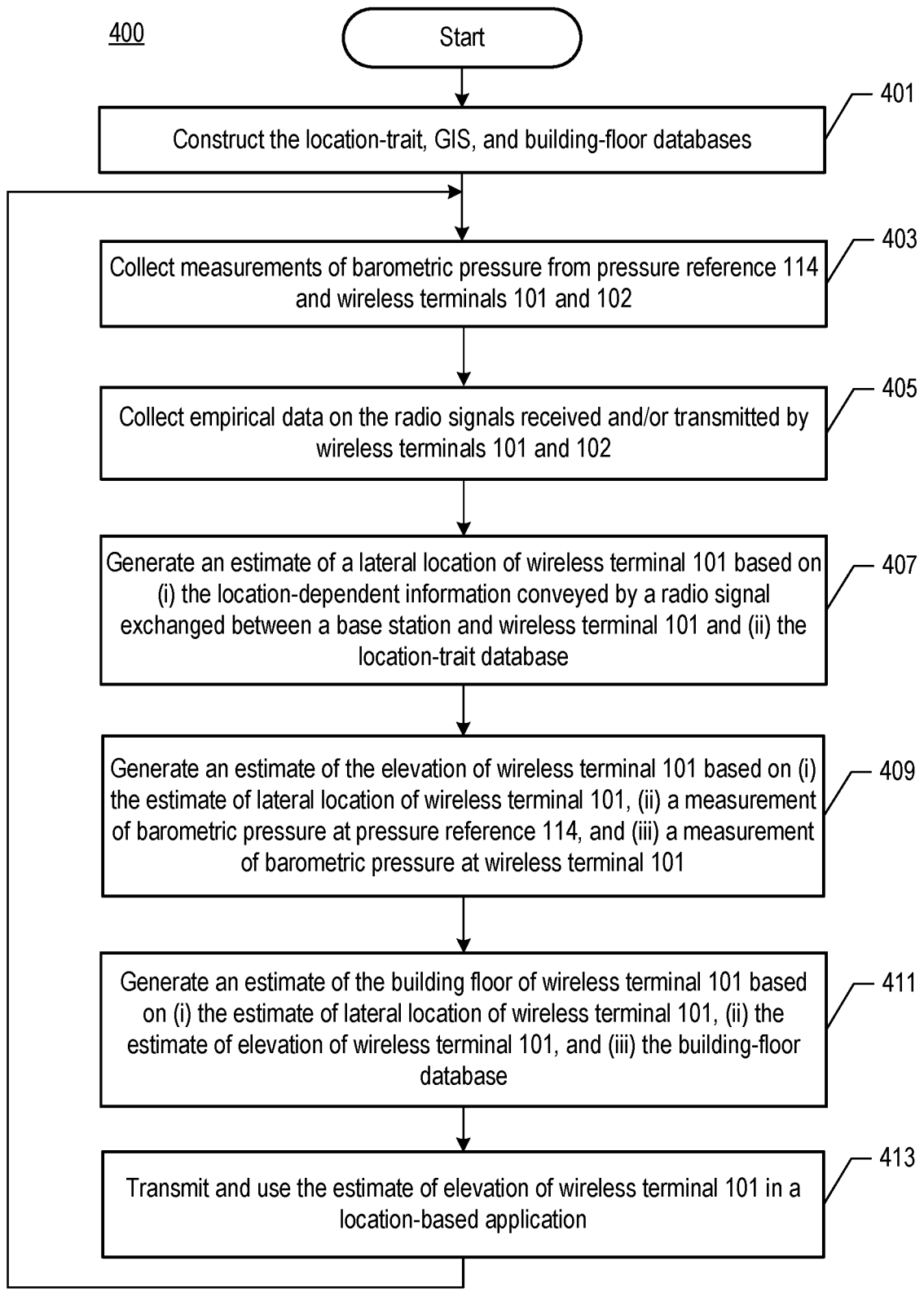
FIG. 4 depicts a flowchart of the salient processes performed as part of method 400 in accordance with the illustrative embodiment of the present invention.

FIG. 4 depicts a flowchart of the salient processes performed as part of method 400 in accordance with the illustrative embodiment of the present invention. It will be clear to those having ordinary skill in the art, after reading the present disclosure, how to make and use alternative embodiments of method 400, as well as the other methods disclosed in this specification, wherein the recited operations sub-operations, and messages are differently sequenced, grouped, or sub-divided—all within the scope of the present disclosure. It will also be clear to those skilled in the art, after reading the present disclosure, how to make and use alternative embodiments of the disclosed methods wherein some of the described operations, sub-operations, and messages are optional, or are omitted.

It will also be clear to those skilled in the art, after reading the present disclosure, how to make and use alternative embodiments of the disclosed methods wherein some of the disclosed operations are performed by other elements and/or systems. For example and without limitation, at least some of the operations disclosed as being performed by location engine 113 can be performed by one or more wireless terminals (e.g., terminal 101, terminal 102, etc.).

In accordance with operation 401, the location-trait database, the GIS database, and the building-floor database are constructed and stored in memory 303 of location engine 113. Operation 401 is described in detail below and in regard to FIG. 5.

In accordance with operation 403, location engine 113 collects measurements of barometric pressure from wireless terminals 101, 102, 131, and 132, and from pressure reference 114. In some embodiments of the present invention, location engine 113 can also collect measurements of temperature and/or humidity. Location 113 collects the measurements in a manner similar to that described below and in regard to FIG. 12.

In accordance with operation 405, location engine 113 collects empirical data on the radio signals received and transmitted by wireless terminals 101, 102, 131, and 132. Operation 405 is described in detail below and in regard to FIG. 15.

Figure 8:
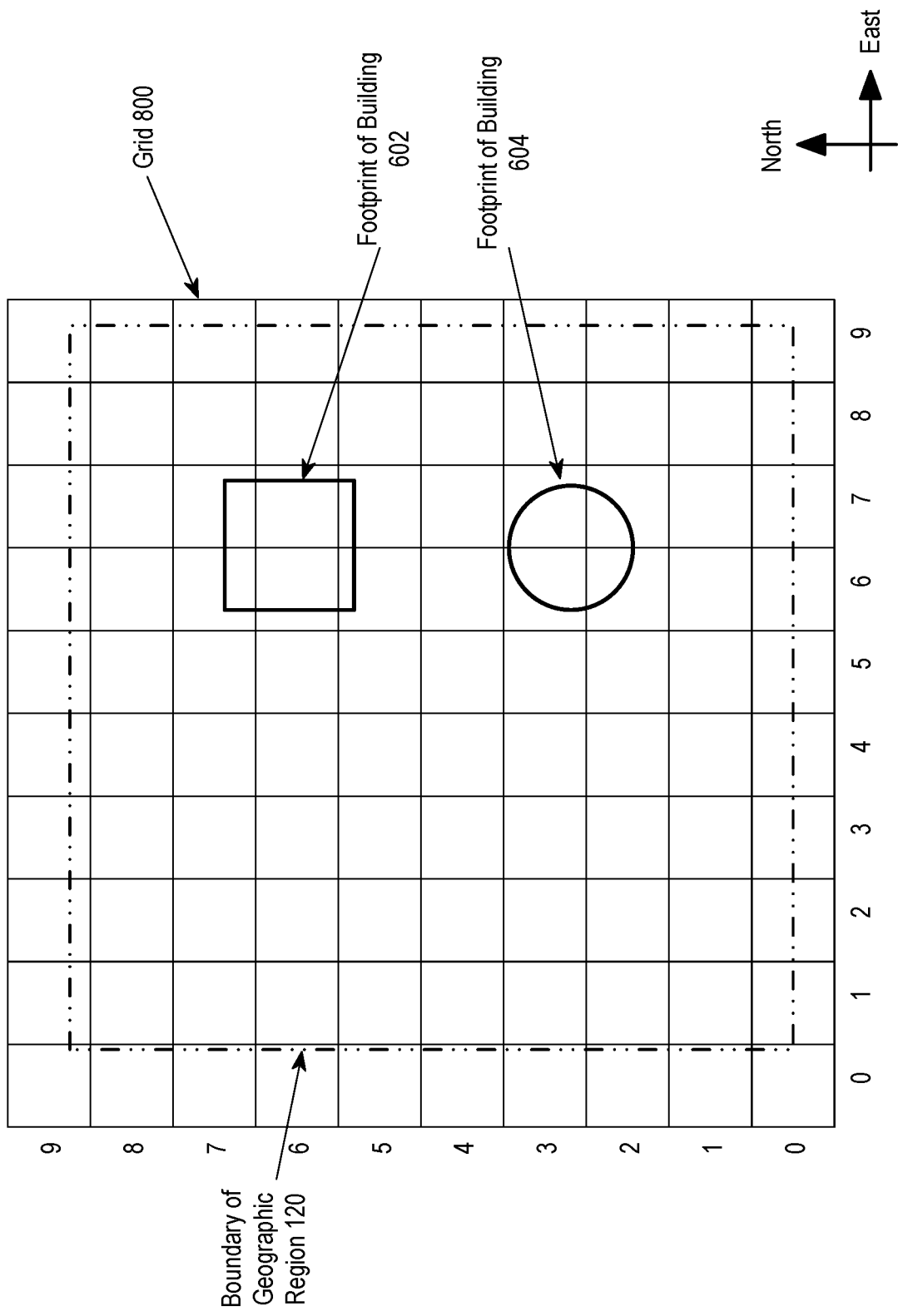
FIG. 8 depicts geographic region 120 divided into a 10-by-10 grid.

In accordance with operation 407, location engine 113 generates an estimate of the lateral location of wireless terminal 101 based on:
  (i) the location-dependent information conveyed by a radio signal exchanged between a base station (e.g., cellular base station 103-$i$, Wi-Fi base station 104-$j$, etc.) and wireless terminal 101 (e.g., the empirical data for the radio signals received in operation 405, etc.), and
  (ii) the location-trait database,
in well-known fashion. It will be clear to those skilled in the art how to make and use embodiments of the present invention to perform operation 407. See for example and without limitation, U.S. Pat. Nos. 6,944,465, 7,460,505, 7,383,051, 7,257,414, 7,753,278, 7,433,695, 7,848,762, and 8,630,665, each of which are incorporated by reference. In accordance with the illustrative embodiment of the present invention, the estimate of the lateral location of wireless terminal 101 is one grid square in geographic region 120 (as depicted in FIG. 8).

As those who are skilled in the art will appreciate after reading this specification, in some alternative embodiments the lateral location can be determined using a different technique than RF pattern matching (e.g., Global Navigation Satellite System [GNSS], etc.) that is based on a measurement of a location-dependent trait of a radio signal and/or on the identity of a radio signal.

In accordance with operation 409, location engine 113 generates an estimate of the elevation of wireless terminal 101 based on:
  (i) the estimate of lateral location of wireless terminal 101 generated in accordance with operation 407,
  (ii) a measurement of barometric pressure at pressure reference 114 obtained in accordance with operation 403, and
  (iii) a measurement of barometric pressure at wireless terminal 101 obtained in accordance with operation 403.

Operation 409 is described in detail below and in regard to FIG. 16.

In accordance with operation 411, location engine 113 generates an estimate of the building floor of wireless terminal 101 based on:
 (i) the estimate of lateral location of wireless terminal 101 generated in accordance with operation 407, and
 (ii) the estimate of elevation generated in accordance with operation 409, and
 (iii) the building-floor database constructed in accordance with operation 503.
Operation 411 is described in detail below and in regard to FIG. 17.

In accordance with operation 413, location engine 113 transmits:
 (i) the estimate of the lateral location of wireless terminal 101 generated in accordance with operation 409, and/or
 (ii) the estimate of the building floor of wireless terminal 101 generated in accordance with operation 411,
to a data-processing system for use in a location-based application, such as to location-based application server 112 and/or a wireless terminal.

In some embodiments of the present invention, location engine 113 also transmits the estimate of the elevation of the wireless terminal and/or the accuracy of the building floor estimate. In some embodiments of the present invention, location engine 113 displays (e.g., on a display, etc.) the estimate of the lateral location of the wireless terminal, the estimate of the building floor, the estimate of the elevation of the wireless terminal and/or the accuracy of the building floor estimate, instead of or in addition to transmitting them. It will be clear to those skilled in the art how to make and use embodiments of the present invention that perform operation 413.

After operation 413 is completed, control passes back to operation 403.

Operation 401: Construct the GIS Database and the Location-Trait Database—

Figure 5:
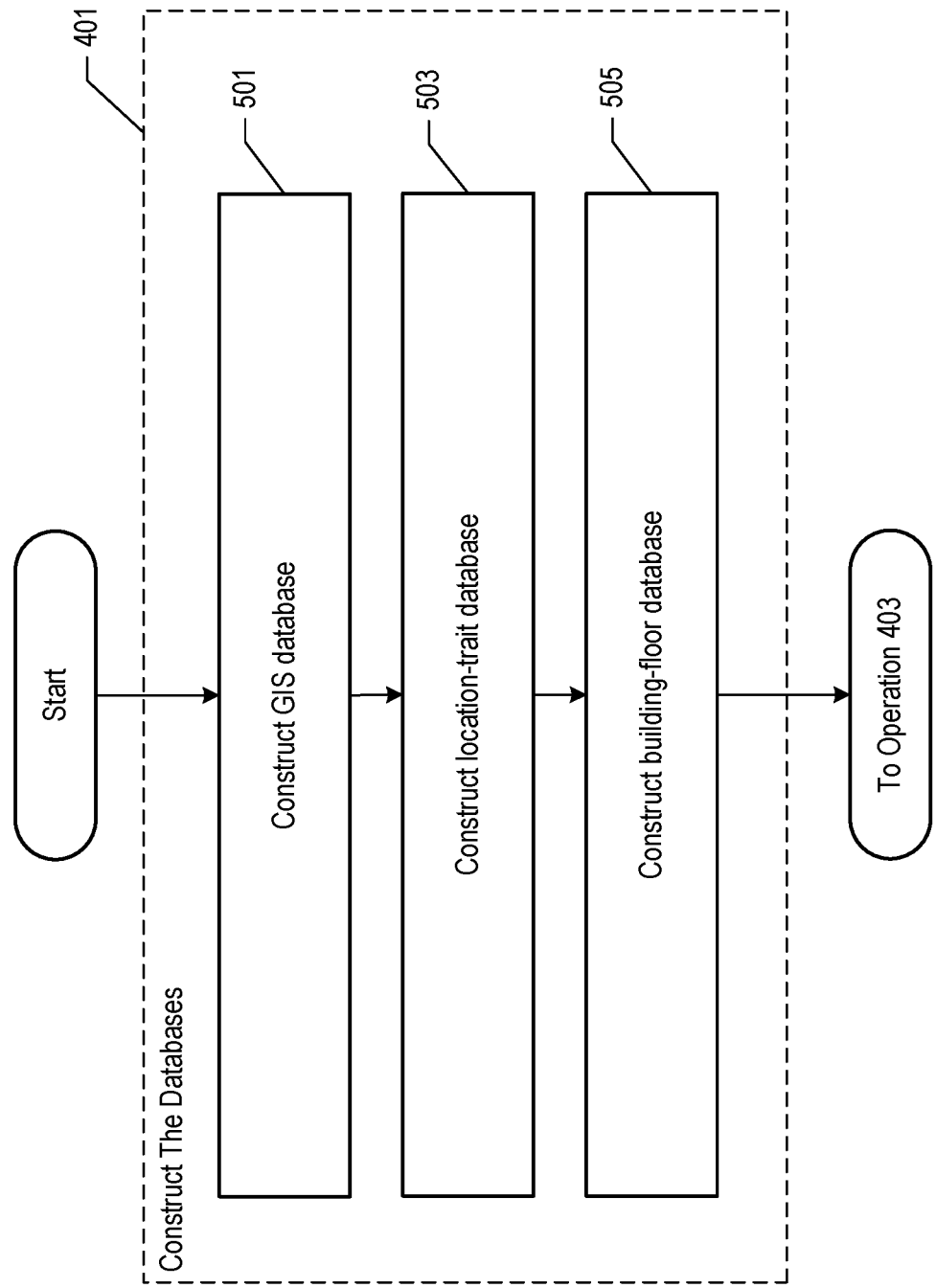
FIG. 5 depicts a flowchart of the salient processes performed in accordance with operation 401 of method 400.

FIG. 5 depicts a flowchart of the salient processes performed in accordance with operation 401.

At operation 501, the GIS database is constructed and stored in memory 303 of location engine 113.

Figure 6:
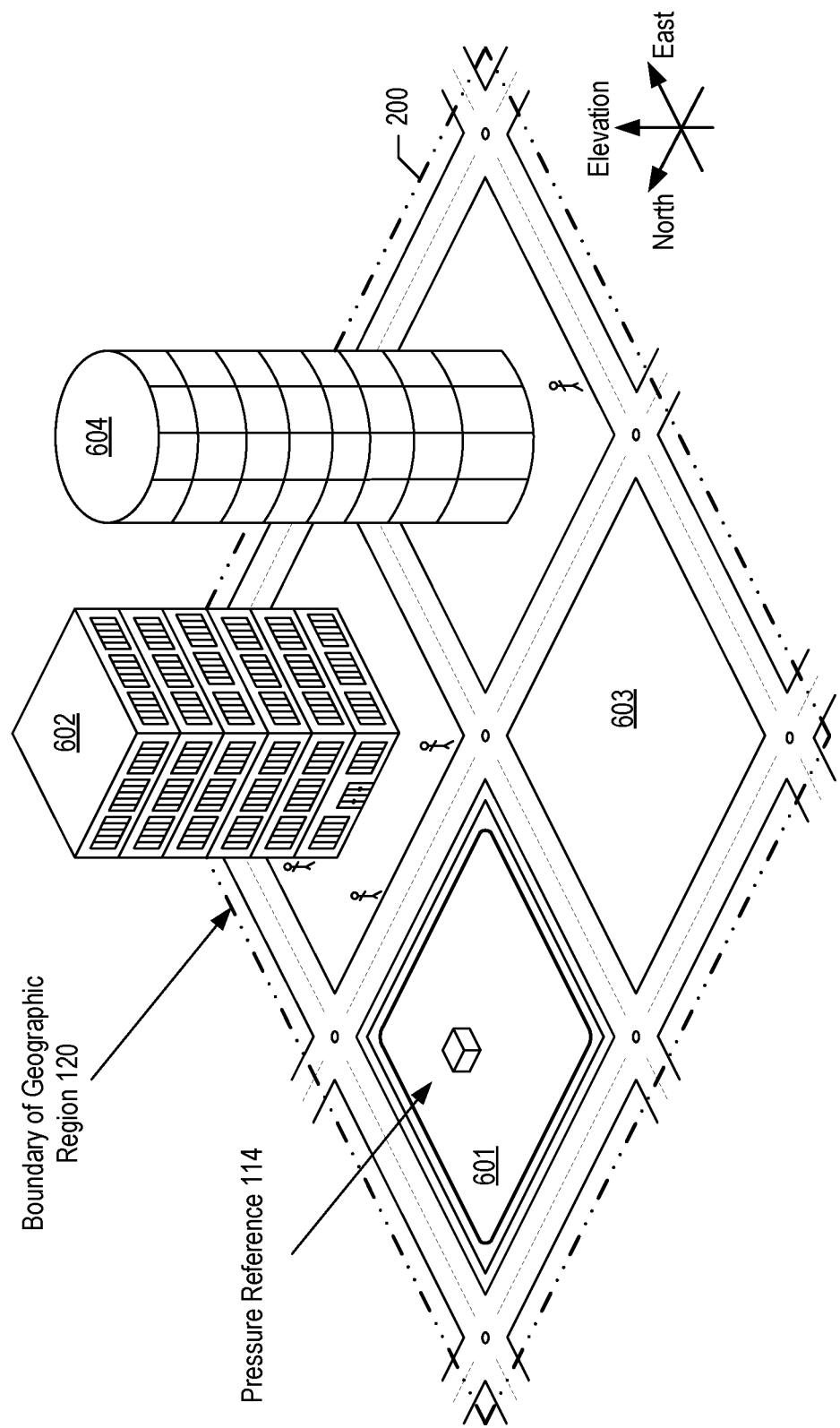
FIG. 6 depicts an isometric drawing of geographic region 120 in accordance with the illustrative embodiment of the present invention.

As part of operation 501, geographic region 120 is delimited and surveyed. FIG. 6 depicts a detailed map that is made of geographic region 120, which spans approximately four city blocks and comprises, among other things, park 601, boxy building 602, empty lot 603, cylindrical building 604, and pressure reference 114. It will be clear to those skilled in the art, after reading this disclosure, how to make and use alternative embodiments of the present invention that comprise any area, any geographic features, and any number, size, height, and shape of structures.

In accordance with the illustrative embodiment, geographic region 120 is flat, level, and at an elevation of 1000 meters, a known elevation. It will be clear to those skilled in the art, however, after reading this disclosure, how to make and use alternative embodiments of the present invention in which geographic region is not flat, not level, and/or is at a different elevation.

In accordance with the illustrative embodiment, the height of boxy building 602 is 128 meters and the height of cylindrical building 604 is 140 meters. In other words, the elevation of boxy building 602 is 1128 meters and the elevation of cylindrical building 604 is 1140 meters. It will be clear to those skilled in the art, after reading this disclosure, how to make and use alternative embodiments of the present invention in which the structures have any height.

Figure 7:
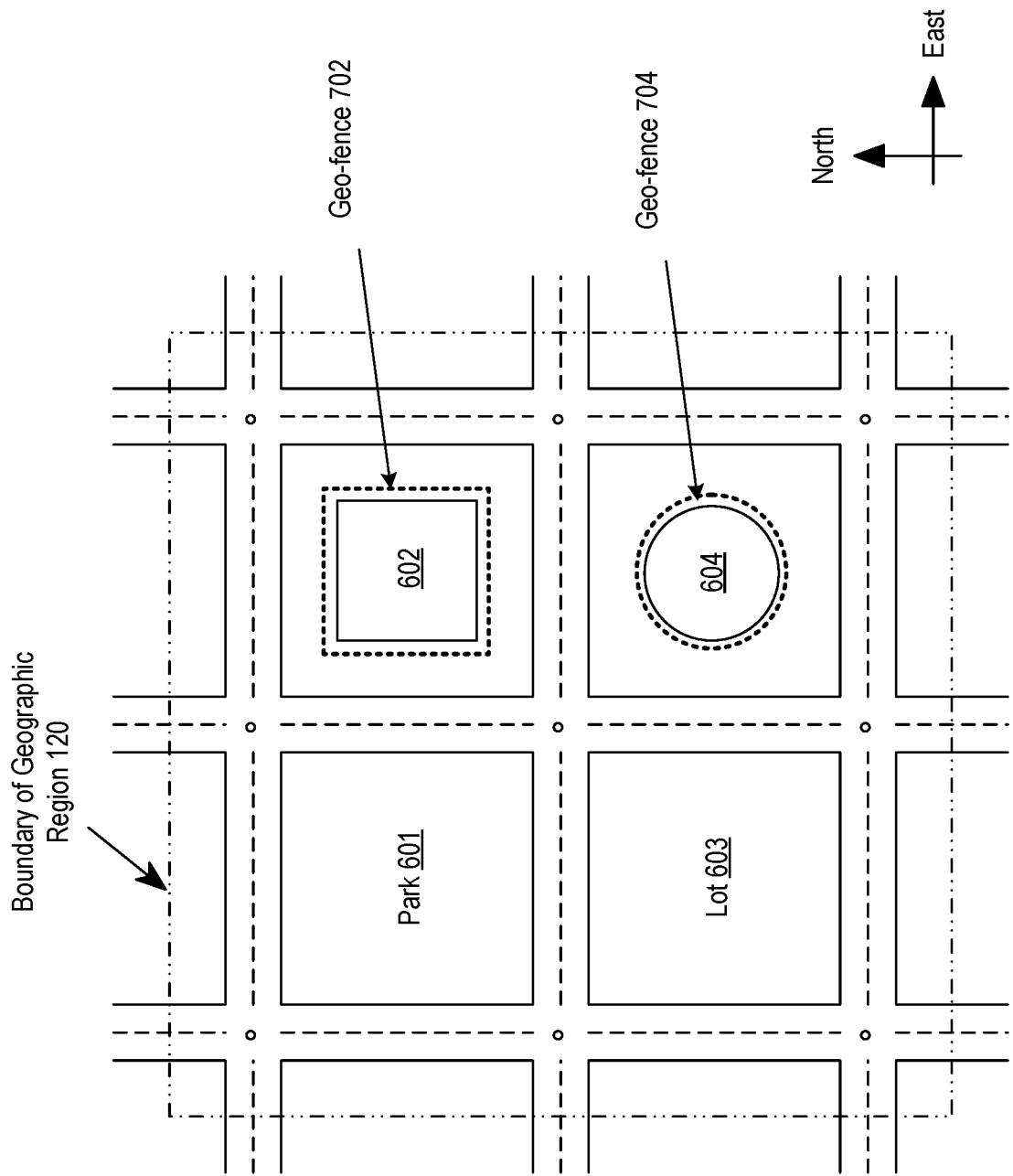
FIG. 7 a detailed map of the ground level of geographic region 120.

In accordance with the illustrative embodiment, geographic region 120 is square and comprises approximately four city blocks of an urban environment. It will be clear to those skilled in the art however, after reading this disclosure, how to make and use alternative embodiments of the present invention in which geographic region 120 has any area of any shape and any population density and development. As part of operation 501, a detailed map of the ground level of geographic region is made in well-known fashion, and as shown in FIG. 7, which also depicts geofence 702 around building 602 and geofence 704 around building 604.

As part of operation 501, grid 800 is overlaid onto geographic region 120 as shown in FIG. 8. Grid 800 is a 10-by-10 grid that partitions geographic region 120 into a plurality of possible lateral locations of wireless terminal 101. FIG. 8 also depicts the relationship of the footprints of boxy building 602 and cylindrical building 604 with respect to the grid.

Although the illustrative embodiment comprises 100 grid squares, it will be clear to those skilled in the art how to make and use alternative embodiments of the present invention that comprise any number of possible lateral locations with any shape. See for example and without limitation, U.S. Pat. No. 7,753,278, which is incorporated by reference.

At any instant, the three-dimensional location of wireless terminal 101 can be described by a combination of a lateral location and an elevation. Although it is not improbable for wireless terminal 101 to be at any lateral location in geographic region 120 and it is not improbable for wireless terminal 101 to be at any elevation (up to 1140 meters) above geographic region 120, it is improbable for wireless terminal 101 to be at some combinations of those lateral locations and elevations. For example, it is not improbable for wireless terminal 101 to be at a lateral location in park 601 and to have an elevation of 1001 meters (i.e., be at or near ground level). It is, however, improbable for wireless terminal 101 to be at a lateral location in park 601 and to have an elevation of 1060 meters.

Therefore, as part of operation 501, each improbable combination of lateral locations and elevations for wireless terminal 101 in geographic region is determined, indexed by elevation, and stored in the GIS database. Each improbable combination of lateral locations and elevation for wireless terminal 101 can be determined by referencing the three-dimensional survey of geographic region 120, which is depicted in FIG. 9.

Figure 9:
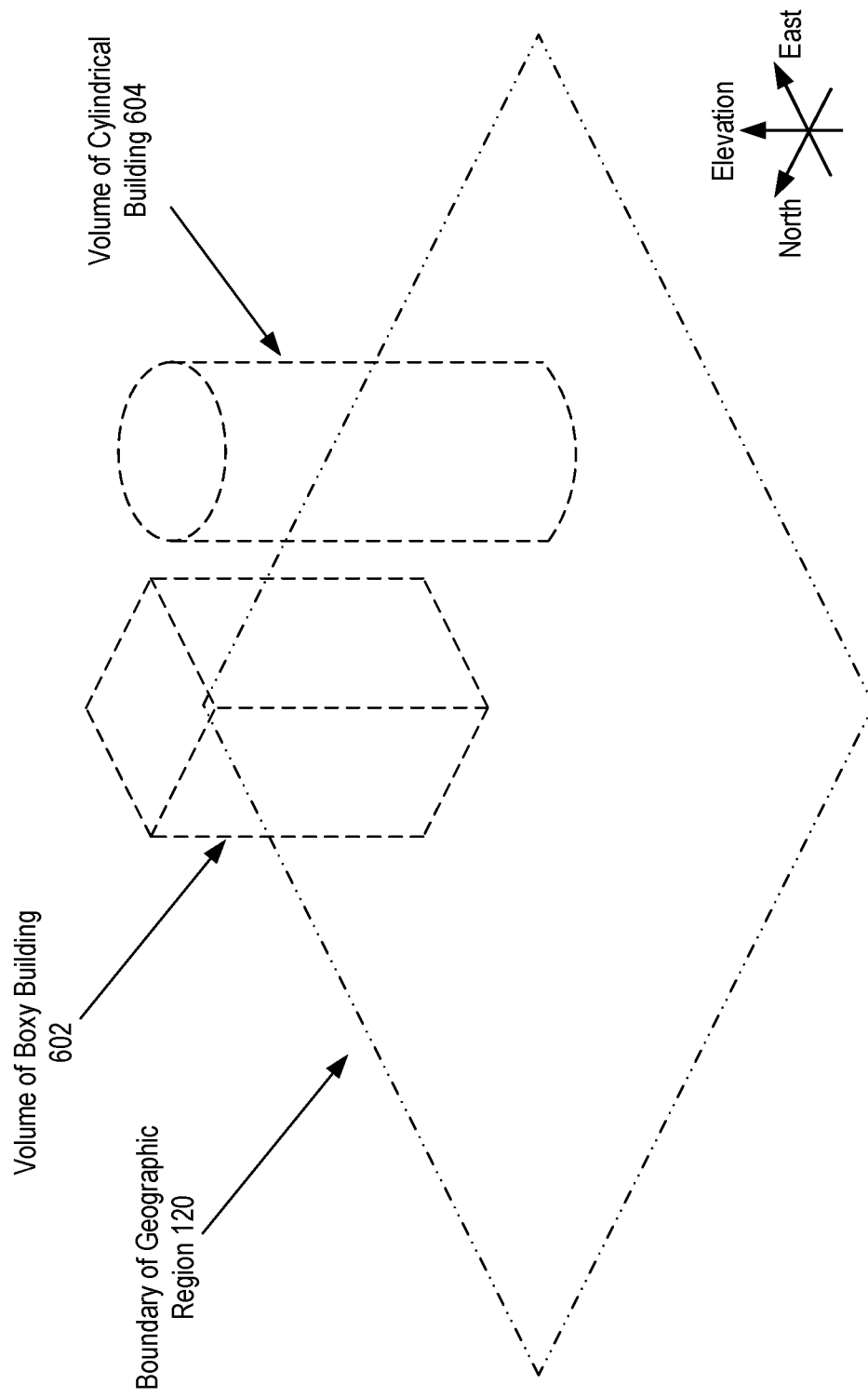
FIG. 9 depicts a three-dimensional survey of geographic region 120.

From the survey (as depicted in FIGS. 8 and 9), it can be seen that when wireless terminal 101 is at ground level (e.g., under an elevation of 1003 meters, etc.), it is not improbable for wireless terminal 101 to be at any lateral location in geographic region 120.

In contrast, when wireless terminal 101 is at an elevation above ground level (e.g., above an elevation of 1003 meters, etc.) and below the rooftop of building 602 (1128 meters), it is improbable for wireless terminal 101 to be at any lateral location that is outside of either boxy building 602 or cylindrical building 604, given the boundaries of the buildings. Therefore, when wireless terminal 101 is in this range of elevations, the plurality of lateral locations of wireless terminal 101 that are not improbable include the following coordinates referenced in FIG. 8: (6,2), (6,3), (6,5), (6,6), (6,7), (7,2), (7,3), (7,5), (7,6), and (7,7).

When wireless terminal 101 is at an elevation above the rooftop of building 602 (1128 meters) and below the rooftop of building 604 (1140 meters), it is improbable for wireless terminal 101 to be at any lateral location that is outside of cylindrical building 604. Therefore, when wireless terminal 101 is in this range of elevations, the plurality of lateral locations of wireless terminal 101 that are not improbable include: (6,5), (6,6), (6,7), (7,5), (7,6), and (7,7).

This information is stored in the GIS database in memory 303 as shown in Table 1.

TABLE 1

Possible Lateral Locations of Wireless Terminal 101 That Are Not Improbable Given The Elevation of Wireless Terminal 101

| Elevation of Wireless Terminal 101 | Possible Lateral Locations of Wireless Terminal 101 That Are Not Improbable |
|---|---|
| 1000 to 1003 meters | All 100 Grid Squares |
| 1003 to 1128 meters | (6, 2), (6, 3), (6, 5), (6, 6), (6, 7), (7, 2), (7, 3), (7, 5), (7, 6), (7, 7) |
| 1028 to 1140 meters | (6, 5), (6, 6), (6, 7), (7, 5), (7, 6), (7, 7) |

At operation 503, the location-trait database is constructed and stored into memory 303 of location engine 113. As part of operation 503, the identity—and location-dependent traits for—each radio signal that a wireless terminal (e.g., terminal 101, terminal 102, etc.) is expected to be able to receive from cellular base stations 103-1, 103-2, and 103-3, Wi-Fi base stations 104-1 and 104-2, for each possible lateral location of the wireless terminal, is determined in well-known fashion.

As part of operation 503, the identity of—and location-dependent traits for—each radio signal that each of cellular base stations 103-1, 103-2, and 103-3, Wi-Fi base stations 104-1 and 104-2 is expected to be able to receive from a wireless terminal 101, for each possible lateral location of the wireless terminal, is determined in well-known fashion.

It will be clear to those skilled in the art how to accomplish operation 503, and in accordance with the illustrative embodiment, this is accomplished through a combination of "drive testing" (i.e., empirical data gathering) and radio-frequency propagation modeling. See for example and without limitation, U.S. Patent Application Publications 2008/0077356, 2008/0077472, and 2008/0077516, which are incorporated by reference.

Figure 10:
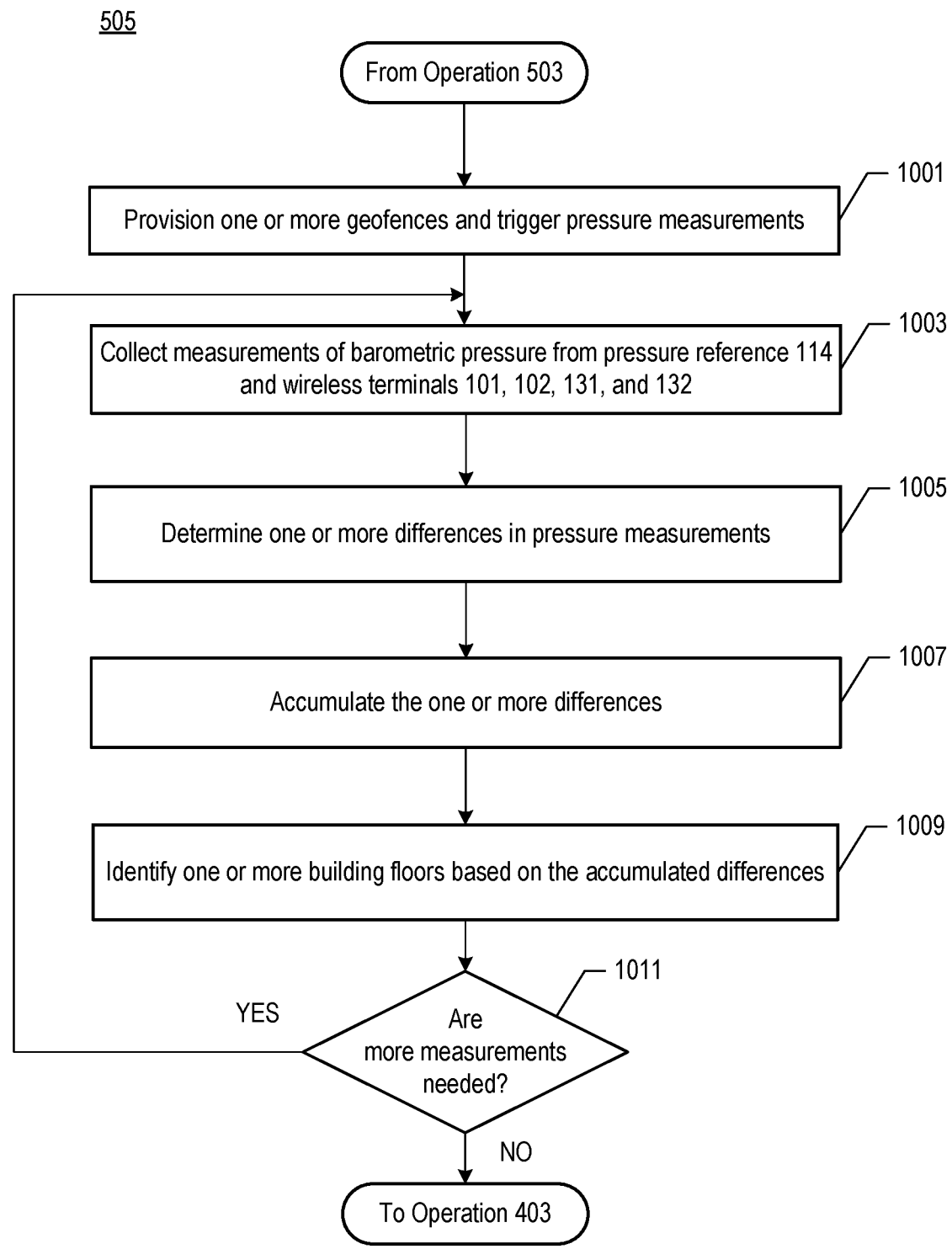
FIG. 10 depicts a flowchart of the salient processes performed in accordance with sub-operation 505 of operation 401.

At operation 505, location engine 113 constructs the building-floor database and stores it into memory 303. FIG. 10 depicts a flowchart of the salient processes performed in accordance with operation 505.

At operation 1001, location engine 113 provisions geofence 702 in FIG. 7 around building 602 and geofence 704 around building 604, and triggers the reporting of pressure measurements by a wireless terminal based on the terminal entering an area that is defined by a geofence. Operation 1001 is described below and in regard to FIGS. 11A and 11B.

At operation 1003, location engine 113 collects measurements of barometric pressure from one or more of wireless terminals 101, 102, 131, and 132, in response to one or more of the wireless terminal having entered an area defined by a geofence. Location engine 113 also collects measurements of barometric pressure from pressure reference 114. In some embodiments of the present invention, location engine 113 can also collect measurements of temperature and/or humidity. Operation 1003 is described in detail below and in regard to FIG. 12.

As part of operation 1003, location engine 113 receives a series of measurements of barometric pressure at wireless terminal 101, a series of such barometric pressure measurements at wireless terminal 102, a series of such pressure measurements at wireless terminal 131, and a series of such pressure measurements at wireless terminal 132. At least some of the measurements received from wireless terminal 102 are probative of terminal 102 being at a first elevation within building 604, which is associated with geofenced area 704 that terminal 102 has entered. Additionally, at least some of the other measurements received from wireless terminal 102 are probative of terminal 102 being at a second elevation within building 604. In accordance with the illustrative embodiment, the first elevation is associated with (i.e., "within" or "at" or "on") the ground floor of the building, and the second elevation is associated with an as yet unknown building floor.

Furthermore, at least some of the measurements received from wireless terminal 131 are probative of terminal 131 being at the first elevation within building 604 associated with geofenced area 704 that terminal 131 also has entered. And at least some of the other measurements received from wireless terminal 131 are probative of terminal 131 being at the second elevation within building 604.

Additionally, at least some of the measurements received from wireless terminal 132 are probative of terminal 132 being at the first elevation within building 604, which is associated with geofenced area 704 that terminal 132 also has entered. And at least some of the other measurements received from wireless terminal 132 are probative of terminal 132 being at a third elevation within building 604. For example and without limitation, the third elevation is associated with an as-yet-unknown building floor different from both the ground floor and one that is associated with the second elevation.

In some embodiments of the present invention, location engine 113 also receives measurements of barometric pressure at other wireless terminals in other buildings, such as building 602. The measurements received from the other wireless terminals in the other buildings are probative of those terminals being at various elevations within those buildings. Additionally, some of the measurements received from a given wireless terminal in building 602 are probative of the terminal being at a first elevation, while some of the measurements received from the same wireless terminal in building 602 are probative of the terminal being at a second elevation.

In accordance with the illustrative embodiment, location engine 113 adjusts each pressure measurement received based on one or more additional considerations. First, location engine 113 adjusts each pressure measurement by the corresponding (i.e., cotemporaneous) measurement received from pressure reference 114. This can be performed in order to account for changes in outdoor, weather-related pressure changes that occur in the time between when a wireless terminal is on the ground floor and when it has reached its destination floor. Second, location engine 113 adjusts each pressure measurement in order to account for a building's stack effect, as is well known in the art and described elsewhere in this specification.

At operation 1005, location engine 113 calculates the difference between a first pressure-related value (e.g., corresponding to a ground-floor elevation, etc.) and a second pressure-related value (e.g., corresponding to an unknown-floor elevation, etc.). The first pressure-related value is the result of combining mathematically one or more measurements in the series of pressure measurements that are probative of a given wireless terminal (e.g., terminal 102, etc.) being at the first elevation. The second pressure-related value is the result of combining mathematically one or more measurements in the series of pressure measurements that are probative of the same wireless terminal being at a different elevation than the first elevation (e.g., the second elevation, the third elevation, etc.).

In accordance with the illustrative embodiment, location engine 113 mathematically combines multiple measurements by calculating their median. In alternative embodiments of the present invention, location engine 113 can mathematically combine multiple measurements by calculating a different function (e.g., the mean, the mode, etc.). Location engine 113 combines multiple measurements in order to reduce measurement error. Individual measurements can have an error component because of environmental effects, such as a fan blowing in a room, wind blowing through an office door, a user pressing on a wireless terminal's body resulting in faulty measurements by the barometric sensor, and so forth, for example and without limitation.

At operation 1007, location engine 113 accumulates the difference value that is calculated in accordance with operation 1005—namely, the difference between the elevation corresponding to the ground floor of the building and an elevation corresponding to an unknown floor of the building. The difference value corresponds to the change in pressure between ground floor and the unknown floor. Location engine 113 accumulates the difference value, along with other difference values calculated as the result of other iterations of operation 1005, into building-floor database 313 of memory 303. Because the difference value corresponds to a height difference between ground floor and unknown floor, the difference value is probative of the unknown floor being situated at a particular vertical position relative to the ground floor. Operation 1007 is described in detail below and in regard to FIGS. 13A and 13B.

At operation 1009, location engine 113 attempts to identify one or more building floors, based on the difference values accumulated into database 313. Operation 1009 is described in detail below and in regard to FIG. 14.

At operation 1011, if location engine 113 has to identify additional building floors, which would require additional difference values to be accumulated, then control of execution proceeds back to operation 1003 in order to collect additional measurements of barometric pressure from various wireless terminals. Otherwise, a sufficient representation of one or more building floor positions in relation to the ground floor is considered to have been constructed, and control of execution proceeds to operation 403 in order to determine the vertical location, in terms of building floor, of one or more wireless terminals.

Operation 1001: Provision Pressure Measurement Data—

Figure 11B:
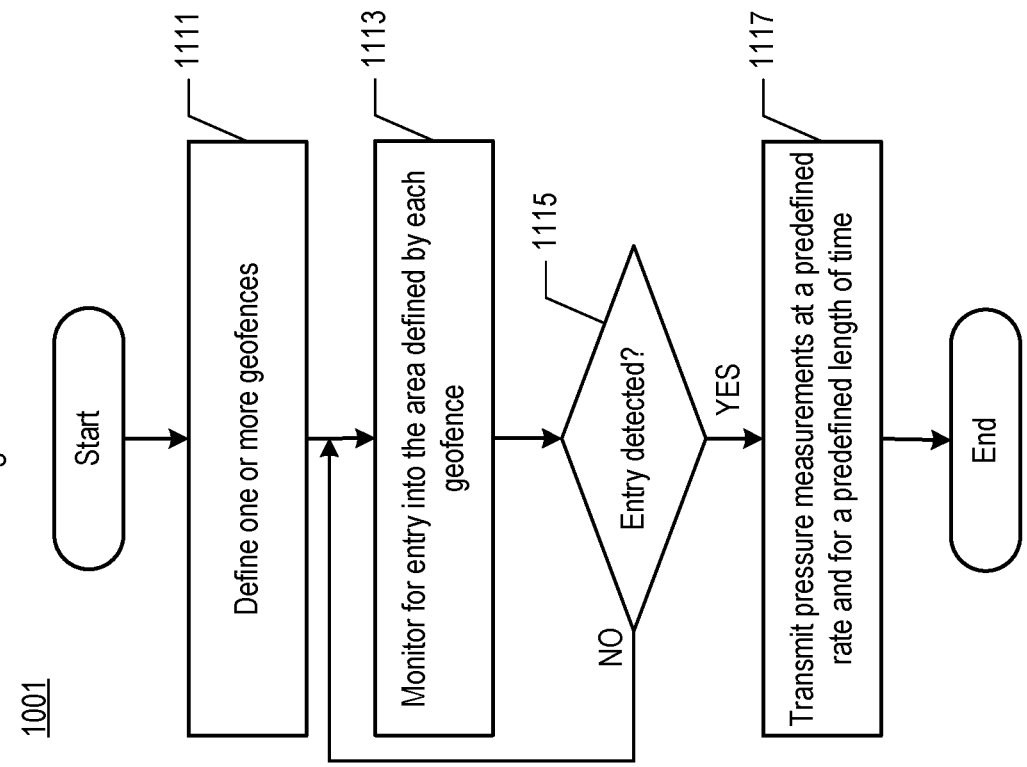
FIGS. 11A and 11B depicts two flowcharts of the salient processes performed in accordance with sub-operation 1001 of operation 505.
Figure 11A:
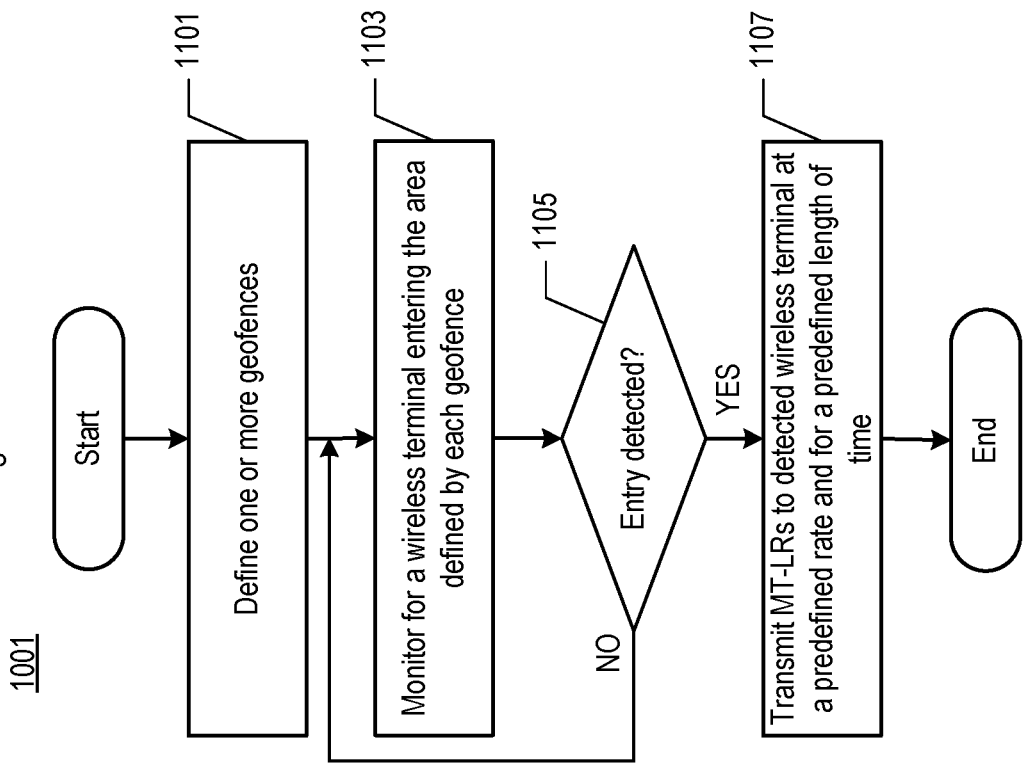

FIGS. 11A and 11B depicts two flowcharts of the salient processes performed in accordance with operation 1001. FIG. 11A depicts a flowchart in which location engine 113 controls the acquisition of pressure measurements from certain wireless terminals (e.g., terminal 101, terminal 102, etc.). FIG. 11B depicts a flowchart in which certain other wireless terminals (e.g., terminal 131, terminal 132, etc.) each control the providing of the pressure measurement data to location engine 113.

In accordance with operation 1101 of FIG. 11A, location engine 113 defines, in database 313 of memory 303, a geofence around each building of interest, in well-known fashion. For example, the location engine defines geofence 702 around building 602 and geofence 704 around building 604.

In accordance with operation 1103, location engine 113 monitors for a wireless terminal entering the area defined by a geofence stored in database 313. If entry into such an area is detected at operation 1105, control of execution proceeds to operation 1107. Otherwise, control of execution returns to operation 1103 to continue monitoring.

In accordance with operation 1107, location engine 113 initiates a series of mobile terminated location requests (MT-LR) involving the wireless terminal that is detected to have entered the geofenced area. Location engine 113 initiates the MT-LRs at this point in order to ensure that it receives a sufficient number of pressure measurements that correspond to the ground floor of the building associated with the geofenced area that the wireless terminal has entered.

For illustrative purposes, wireless terminal 102 is the terminal that is detected to have entered the geofenced area. In accordance with the illustrative embodiment, an MT-LR comprises a message flow in which location engine 113 transmits, to wireless infrastructure 111, a request for evidence of the location of wireless terminal 102. The request for evidence results in wireless terminal 102 being paged; when the paged wireless terminal responds to the page, the response—which is monitored by wireless infrastructures 111's IuB probe, for example—provides evidence of the wireless terminal's location (e.g., the serving cell's ID, the intra- and inter-frequency measurement reports, etc.). The request for evidence of the location of a wireless terminal can also be an SMS message or a voice call directed to the wireless terminal.

In response to receiving each request in the series from location engine 113, wireless infrastructure 111 performs an MT-LR procedure that involves wireless terminal 102 whose location is being requested. Wireless terminal 102 provides location-related information and pressure measurements in response to each MT-LR. The location-related information can comprise evidence of location with which location engine 113 can estimate the location of wireless terminal 102, or an estimate of location (e.g., latitude-longitude, etc.), or both.

Wireless infrastructure 111 forwards the location-related information and pressure measurements received from wireless terminal 102, to location engine 113.

In accordance with the illustrative embodiment, location engine 113 transmits the MT-LRs that correspond to the wireless terminal that entered the geofenced area (i.e., wireless terminal 102 in the example), at a predefined rate and for a predefined length of time. For example, the predefined rate might be higher than the default rate at which MT-LRs are transmitted for keeping the location of the wireless terminal updated.

In some embodiments of the present invention, location engine 113 determines whether a wireless terminal has reached its destination floor (e.g., the floor of the user's office space, etc.). For example, this can be used to determine when enough pressure measurement data has probably been acquired for a given wireless terminal so that the location engine can throttle back the MT-LRs being generated for said terminal. In some embodiments of the present invention, and in addition to transmitting the MT-LRs for a predefined length of time, location engine 113 can receive and use sensor inputs from the wireless terminal 102 (e.g., light is sensed or not sensed, motion is sensed or not sensed, etc.) in order to conclude that the terminal has reached its destination and consequently to end, or throttle back, the MT-LRs being transmitted.

In some embodiments of the present invention, at least some of the wireless terminals, such as terminals 131 and 132, each monitor their own position in relation to one or more geofences, as described here and from the perspective of wireless terminal 131. In accordance with operation 1111 of FIG. 11B, wireless terminal 131 defines, in database 213 of the terminal's memory 203, a geofence around each building of interest, in well-known fashion. For example, the wireless terminal defines geofence 702 around building 602 and geofence 704 around building 604.

In accordance with operation 1113, wireless terminal 131 monitors whether it is entering the area defined by a geofence stored in database 213. If entry into such an area is detected at operation 1115, control of execution proceeds to operation 1117. Otherwise, control of execution returns to operation 1113 to continue monitoring.

In some embodiments of the present invention, wireless terminal 131 determines that it has entered the area of interest (i.e., the building perimeter), by detecting a MAC address and/or an SSID of a WiFi access point that is known to be on the ground floor of the building, and with sufficient signal strength.

In accordance with operation 1117, wireless terminal 131 provides location-related information and pressure measurements in response to having detected its entry into a geofenced area. The location-related information can comprise evidence of location with which location engine 113 can estimate the location of wireless terminal 131, or an estimate of location (e.g., latitude-longitude, etc.), or both.

Wireless infrastructure 111 forwards any location-related information and pressure measurements received from wireless terminal 131, to location engine 113.

In accordance with the illustrative embodiment, wireless terminal 131 provides the location-related information and pressure measurements in response to the wireless terminal having entered the geofenced area, at a predefined rate (e.g., 50 measurements in five seconds, etc.) and for a predefined length of time. For example, the predefined rate might be higher than the default rate at the wireless terminal updates estimates of its current location.

In some embodiments of the present invention, terminal 131 determines whether it has reached its destination floor (e.g., the floor of its user's office space, etc.). For example, this can be used to determine when enough pressure measurement data has probably been acquired for terminal 131 so that it can stop transmitting the data, at least at the predefined rate. In some embodiments of the present invention, terminal 131 can use its sensor inputs (e.g., light is sensed or not sensed, motion is sensed or not sensed, etc.) in order to conclude that it has reached its destination and consequently stop or throttle back the transmitting of the pressure measurement data.

Operation 1003: Collect Barometric Measurements—

Figure 12:
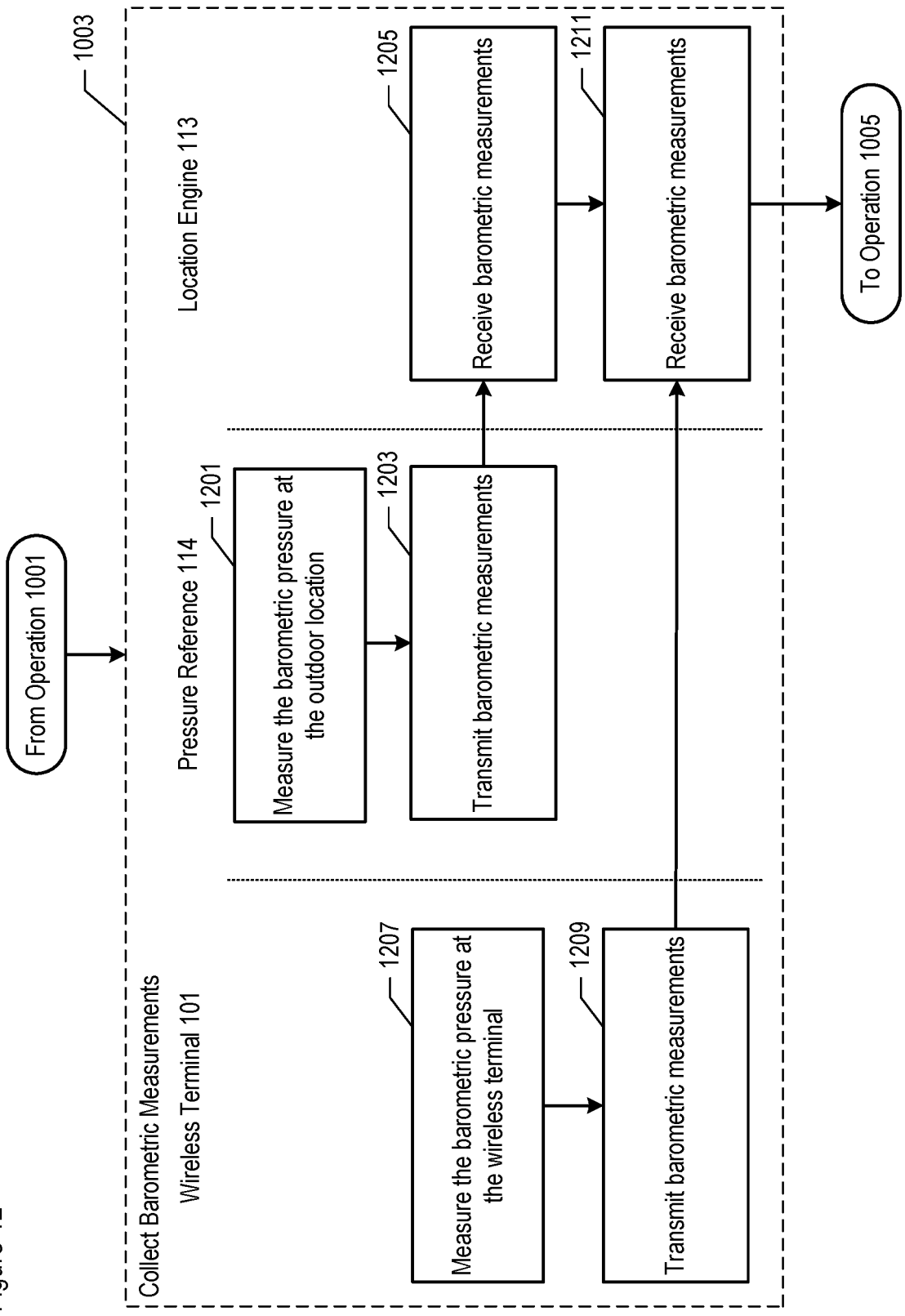
FIG. 12 depicts a flowchart of the salient processes performed in accordance with operations 403 and 1003.

FIG. 12 depicts a flowchart of the salient processes performed in accordance with operations 403 and 1003. For illustrative purposes, wireless terminal 101 is depicted as performing the various operations in FIG. 12 and in other figures below. It will be clear to those skilled in the art after reading this specification, however, how to make and use embodiments of the present invention in which other wireless terminals (e.g., terminal 102, terminal 131, terminal 132, etc.) perform at least some of the operations that wireless terminal 101 is depicted as performing, in addition to or instead of wireless terminal 101.

In accordance with operation 1201, pressure reference 114 measures samples of barometric pressure, $P_T$, in its vicinity. In some embodiments of the present invention, each sample represents one measurement of barometric pressure, while in some other embodiments each sample comprises more than one measurement of barometric pressure.

In accordance with operation 1203, pressure reference 114 transmits a measurement of atmospheric pressure, $P_W$, (i.e., provides a measurement of barometric pressure at an outdoor location) to location engine 113. It will be clear to those skilled in the art how to make and use embodiments of the present invention that transmit the measurements at any frequency.

In accordance with operation 1205, location engine 113 receives the barometric pressure samples transmitted in accordance with operation 1203.

In accordance with operation 1207, wireless terminal 101 measures samples of barometric pressure, $P_T$, in its vicinity by using barometer 205. In some embodiments of the present invention, each sample represents one measurement of barometric pressure, while in some other embodiments each sample comprises more than one measurement of barometric pressure. It will be clear to those skilled in the art how to make and use embodiments of the present invention that take the measurements at any frequency.

In accordance with operation 1209, wireless terminal 101 transmits the samples of barometric pressure, $P_T$, to location engine 113. It will be clear to those skilled in the art how to make and use alternative embodiments of the present invention that transmit the samples of barometric pressure at any frequency.

In accordance with operation 1211, location engine 113 receives the barometric pressure samples transmitted in accordance with operation 1209. In some embodiments of the present invention, location engine 113 combines the values of multiple pressure samples (e.g., by calculating a median, etc.) in order to reduce measurement error.

Operations 1201 through 1211 are performed continuously, concurrently, and asynchronously, in accordance with the illustrative embodiment.

Figure 13:
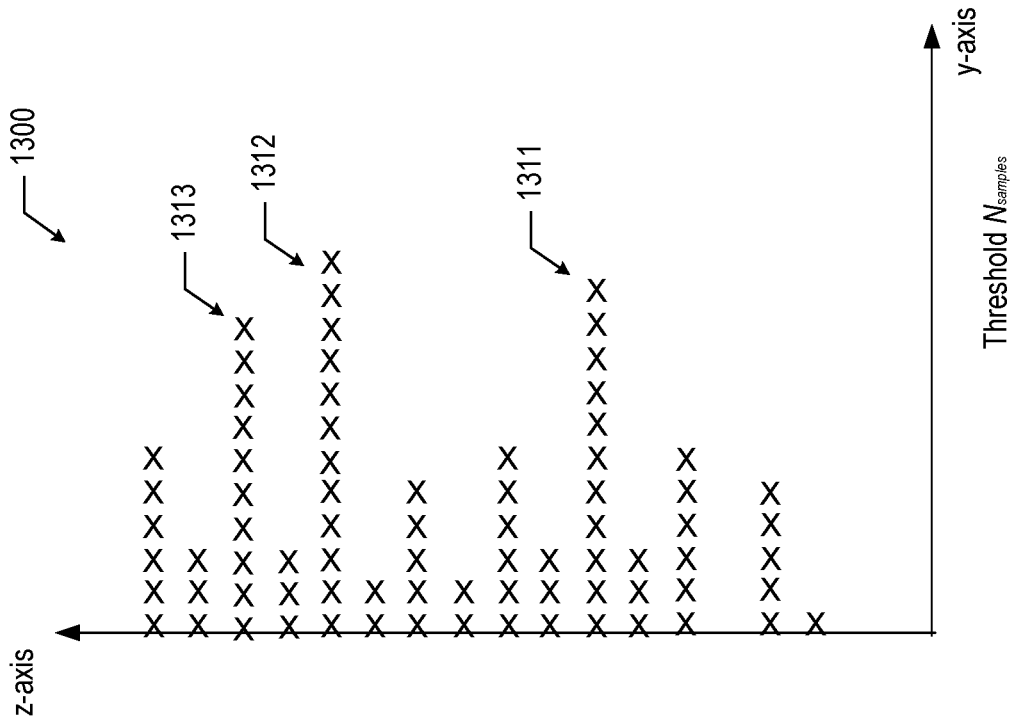
FIGS. 13A and 13B depict histogram 1300 comprising two sets of data points accumulated in accordance with operation 1007.

FIGS. 13A and 13B depict histogram 1300 with a respective first set of data points corresponding to a first number of difference values accumulated in accordance with operation 1007 and second set of data points corresponding to a second number of difference values accumulated. The data accumulated pertains to a particular building—namely, building 604. The "z-axis," as labeled, corresponds to the histogram bin (interval) values of the differences in pressure measurements, and the "y-axis," as labeled corresponds to the number of values within each bin. For pedagogical purposes, histogram 1300 is depicted so that the z-axis of histogram bins is oriented in the same direction as a building's height above its ground floor and, as such, is intended to provide an intuitive depiction of building floor positions above the ground floor.

Histogram 1300 depicts only the ground floor of the corresponding building and the floors that are above the ground floor. However, it will be clear to those who are skilled in the art, after reading this specification, how to make and use embodiments of the invention in which one or more levels that are below ground level are analyzed, and in which below-ground floors (e.g., basement floors, etc.) are estimated and used. Furthermore, it will be clear to those who are skilled in the art, after reading this specification, how to make and use embodiments of the invention in which built structures other than buildings are considered. Such structures include, but are not limited to, subway system levels, mining excavations in the earth, underground walkways, and subterranean shopping malls, and which are structures that might or might not be associated with any particular building.

As described earlier, each difference value—and, consequently, each data point in the histogram—corresponds to the change in pressure between ground floor and an unknown floor. The change in pressure between ground floor and the unknown floor is probative of the unknown floor being situated at a particular vertical position with respect to the ground floor. And when a sufficient number of difference values are accumulated, resulting in a sufficient number of data points in the histogram, one or more patterns can emerge in the data that suggest that one or more building floors exist are certain vertical positions with respect to the ground floor of the building.

For example, the version of histogram 1300 depicted in FIG. 13A is beginning to suggest a pattern, in which there might be more data points corresponding to certain non-ground heights (i.e., heights other than ground height) than to other non-ground heights. There is, however, an insufficient amount of data accumulated in FIG. 13A with which to form any conclusion about the relative vertical position of one or more building floors. In contrast, the version of histogram 1300 depicted in FIG. 13B is considerably more developed than in FIG. 13A. In FIG. 13B, which there appear to be considerably more data points corresponding to certain non-ground heights than to other non-ground heights. Namely, bins 1311, 1312, and 1313 each consist of considerably more data points than are present at some of the other vertical positions in histogram 1300.

Figure 14:
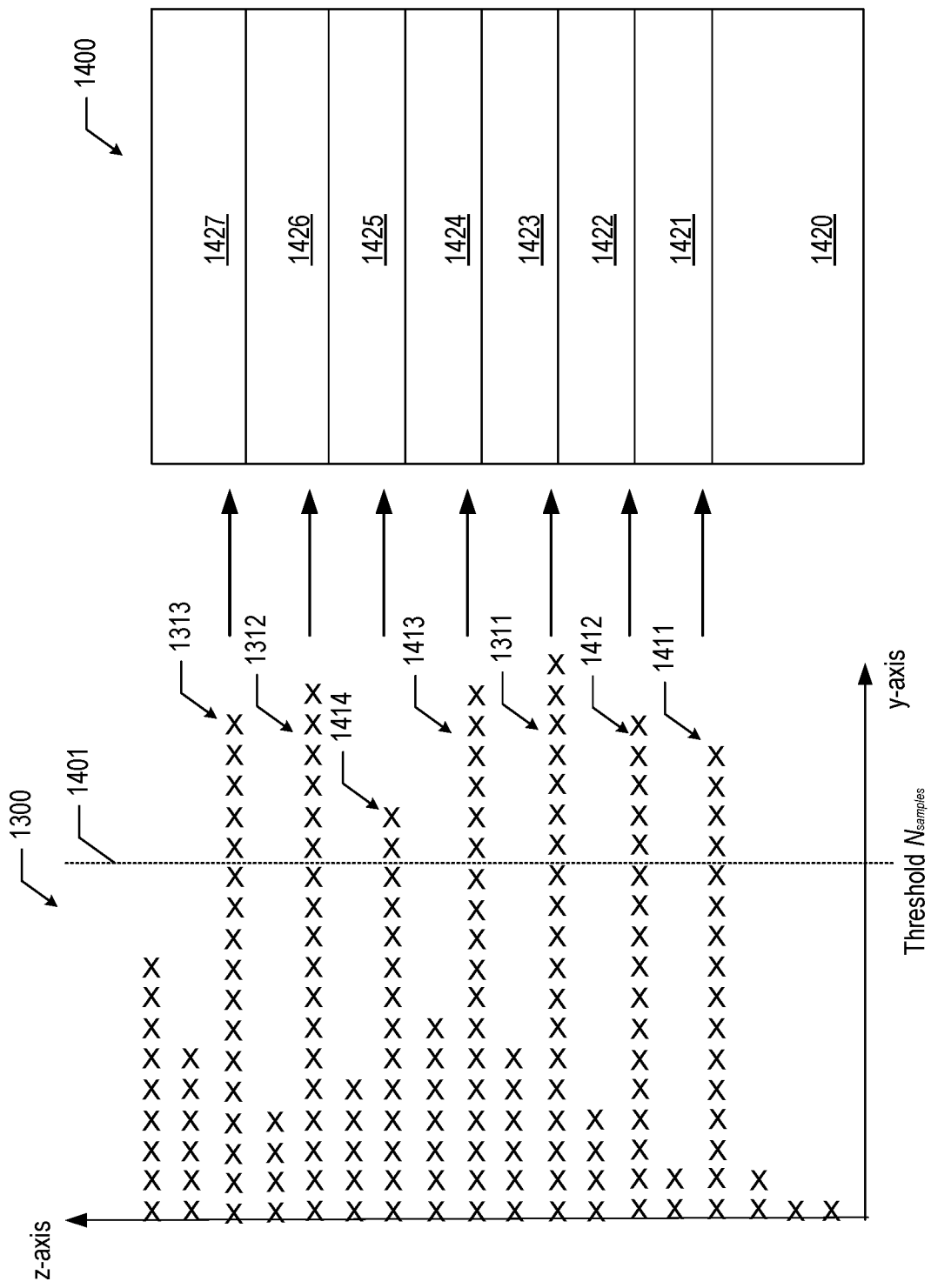
FIG. 14 depicts histogram 1300 comprising a third set of data points, mapped to representation 1400 of building 604.

Location engine 113 continues to accumulate difference values. FIG. 14 depicts histogram 1300 with a respective third set of data points corresponding to a third number of difference values accumulated and representation 1400 comprising the estimated building floors of building 604. The third number of difference values depicted in FIG. 14 is greater than the second number of difference values depicted in FIG. 13B.

In accordance with operation 1009, location engine 113 attempts to identify one or more building floors, based on the difference values accumulated into database 313. In accordance with the illustrative embodiment, location engine 113 uses threshold value 1401 to determine when a sufficient number of data points appear at a certain bin position in order to associate that bin position with a building floor. As those who are skilled in the art will appreciate after reading this specification, in some embodiments a different technique of identifying a building floor can be used, in addition to or instead of using threshold value 1401.

As depicted in FIG. 14, bins 1311, 1312, and 1313 each consist of a greater number of data points than threshold value 1401. Accordingly, location engine 113 identifies bin 1311 as corresponding to one building floor, bin 1312 as corresponding to another building floor, and bin 1313 as corresponding to yet another building floor. As location engine 113 has accumulated additional difference values compared with those represented in FIG. 13B, additional bins 1411 through 1414 also consist of a greater number of data points than threshold value 1401. Accordingly, location engine 113 identifies these other bins as corresponding to respective, distinct building floors as well. In particular, bins 1411, 1412, 1311, 1413, 1414, 1312, and 1313 correspond to estimated building floors 1421, 1422, 1423, 1424, 1425, 1426, and 1427, respectively. Building floor 1420 essentially corresponds to a zero value on the z-axis.

Other features are also evident in FIG. 14. For example, the relatively even spacing between bins 1411, 1412, 1311, 1413, 1414, 1312, and 1313, from smallest to largest pressure difference, suggests a constant difference in building floor heights starting with the building floor corresponding to bin 1411. Also, the larger distance between the y-axis and bin 1411, compared to the distance between each successive bin whose number of data points exceeds threshold value 1401, suggests a ground floor in the building having a higher ceiling than on the other floors. As those who are skilled in the art will appreciate after reading this specification, other aspects of building morphology can be deduced from the accumulated data.

Based on the relative positions of the different histogram bins, location engine 113 constructs a map of i) the pressure value difference to ii) building floor. In some embodiments of the present invention, location engine 113 determines a range of pressure value differences that are estimated to correspond to each particular building floor, and also a corresponding accuracy of how well each pressure difference maps to its corresponding building floor. For example and without limitation, this accuracy can be based on one or more of i) the degree to which a histogram exceeds threshold value 1401 in terms of its number of data points, and ii) the difference in the number of data points within a threshold-exceeding bin versus the number in an adjacent bin or bins.

In accordance with the illustrative embodiment, location engine 113 stops constructing the building-floor database based on comparing i) the results obtained in FIG. 14 for a first interval in time (e.g., a given day, a given week, etc.) with ii) those results obtained a second interval in time (e.g., the previous day, the previous week, etc.). Additionally, based on the height of the particular building as available in the GIS database, location engine 113 can infer whether the top floor or floors of the building have been estimated. For example, if the height of building 604 is 100 meters, but there is insufficient data for heights above 90 meters (i.e., the number of data points in each bin above 90 meters is below threshold value 1401), then location engine 113 can continue to accumulate differences in pressure value.

Operation 405: Collect Empirical Data on Radio Signals—

Figure 15:
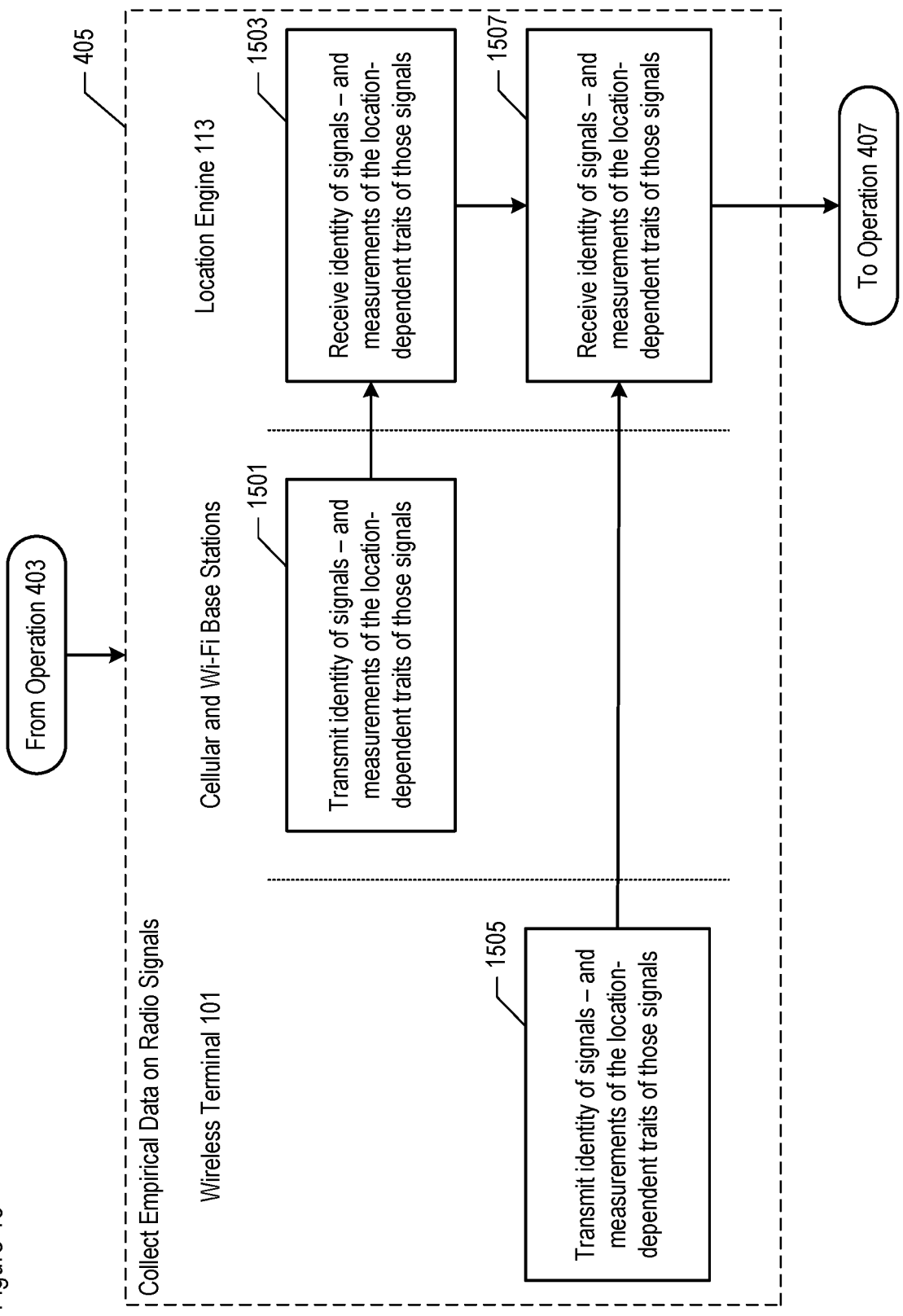
FIG. 15 depicts a flowchart of the salient processes performed in accordance with operation 405.

FIG. 15 depicts a flowchart of the salient processes performed in accordance with operation 405. At operation 1501, each of cellular base stations 103-1, 103-2, and 103-3 and Wi-Fi base stations 104-1 and 104-2 transmits the identity of each signal it has received from wireless terminal 101 and the measurements of the location-dependent traits of those signals—though not necessarily simultaneously or synchronously with one another. In accordance with the illustrative embodiment, operation 1501 is performed every 20 milliseconds, but it will be clear to those skilled in the art how to make and use alternative embodiments of the present invention that transmit the measurements at other times.

At operation 1503, location engine 113 receives the identities and measurements transmitted at operation 1501.

At operation 1505, wireless terminal 101 transmits the identity of each signal it receives from cellular base stations 103-1, 103-2, and 103-3 and Wi-Fi base stations 104-1 and 104-2 and the measurements of the location-dependent traits of those signals. In accordance with the illustrative embodiment, operation 1505 is performed every 20 milliseconds, but it will be clear to those skilled in the art how to make and use alternative embodiments of the present invention that transmit the measurements at other times.

At operation 1507, location engine 113 receives the identities and measurements transmitted at operation 1505.

Operations 1501 through 1507 are performed continuously, concurrently, and asynchronously, in accordance with the illustrative embodiment.

Operation 409: Estimate the Elevation of Wireless Terminal 101—

Figure 16:
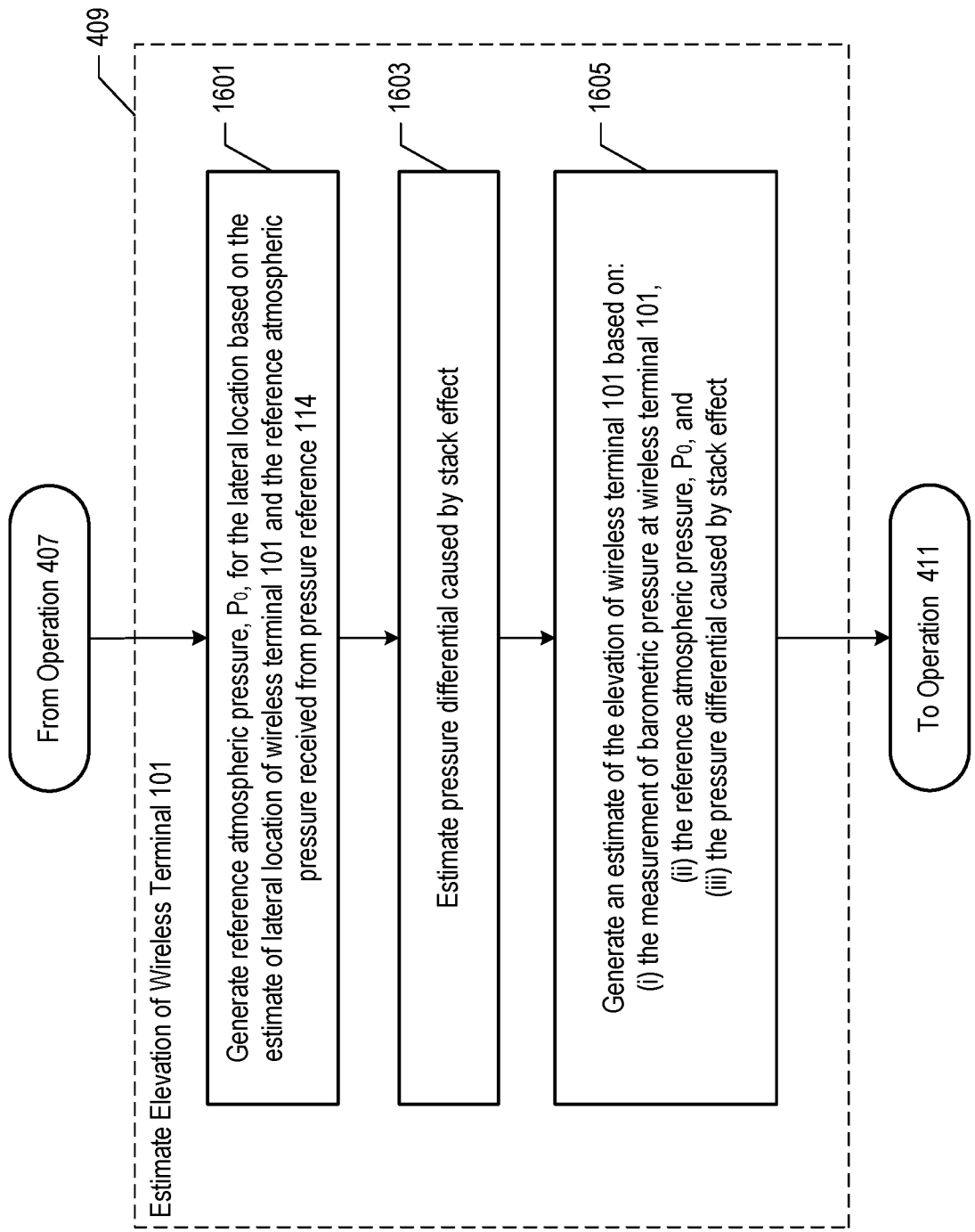
FIG. 16 depicts a flowchart of the salient processes performed in accordance with operation 409.

FIG. 16 depicts a flowchart of the salient processes performed in accordance with operation 409.

At operation 1601, location engine 113 generates, $P_O$, which is an estimate of the reference atmospheric pressure for the lateral location estimated in accordance with operation 407 and within geographic location 120, based on:

$$P_0 = \frac{P_W}{e^{-\left(\frac{Z_W}{H}\right)}} \quad \text{(Eq. 2)}$$

wherein:
- $P_W$ is the measurement of atmospheric pressure received from pressure reference 114 that most closely corresponds in time to the measurement of atmospheric pressure of interest received from wireless terminal 101, $P_T$,
- $Z_W$ is the elevation of pressure reference 114 (1000 meters in the illustrative embodiment), and
- H is the scale height of the atmosphere, which is the elevation at which the atmospheric pressure has decreased to $e^{-1}$ times its value at mean sea level (e.g., approximately 7000 meters).

As those who are skilled in the art will appreciate after reading this specification, in some alternative embodiments $P_O$ can be determined using a different equation than that described above.

In accordance with the illustrative embodiment, location engine 113 has access to multiple pressure references, such as reference 114, and uses a measurement $P_W$ from the pressure reference that is the closest to the lateral location estimated in accordance with operation 407, along with the $Z_W$ corresponding to said pressure reference. In some embodiments of the present invention, location engine 113 uses a measurement $P_W$ from the pressure reference that is most closely related to the lateral location estimated in accordance with operation 407, in some other way than closest distance.

In some alternative embodiments of the present invention, $P_W$ and corresponding $Z_W$ are generated from the data originating from a plurality of pressure references, including reference 114, as part of a pressure reference network.

At operation 1603, location engine 113 generates an estimate of the pressure differential, $P_M$, based on a stack-effect compensation model. For details on a stack-effect compensation model, see for example and without limitation U.S. Pat. No. 9,237,423, which is incorporated by reference. It will be clear to those skill in the art, after reading this disclosure, how to make and use embodiments of the present invention that perform operation 1603.

At operation 1605, location engine 113 generates an estimate of the elevation of wireless terminal 101, $Z_T$, based on:

$$Z_T = -H \ln\left(\frac{P_T - P_M}{P_0}\right) \quad \text{(Eq. 3)}$$

wherein:
- H is the scale height of the atmosphere (described above),
- $P_T$ is the relevant measurement of atmospheric pressure received from wireless terminal 101,
- $P_M$ is the pressure differential determined in accordance with operation 1603, and
- $P_O$ is the reference atmospheric pressure determined in accordance with operation 1601.

As those who are skilled in the art will appreciate after reading this specification, in some alternative embodiments $Z_T$ can be determined using a different equation than that described above. In some embodiments of the present invention, $P_T$ is adjusted by an estimate of bias of barometric pressure at wireless terminal 101.

Operation 411: Estimate the Building Floor of Wireless Terminal 101—

Figure 17:
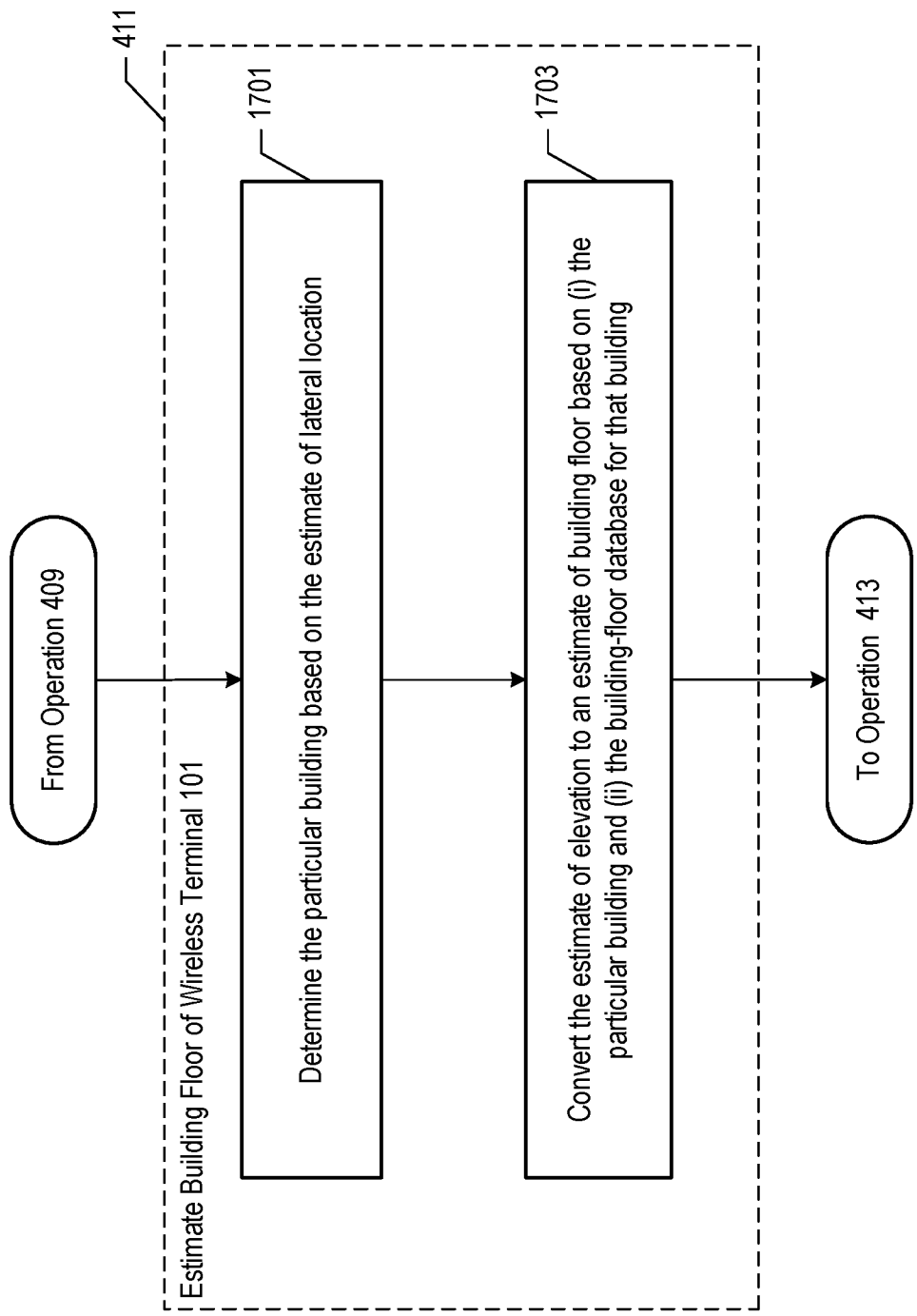
FIG. 17 depicts a flowchart of the salient processes performed in accordance with operation 411.

FIG. 17 depicts a flowchart of the salient processes performed in accordance with operation 411.

At operation 1701, location engine 113 estimates the particular building that wireless terminal 101 is in, based on the estimate of lateral location generated at operation 407 and the GIS database constructed at operation 501 and stored in database 313.

At operation 1703, location engine 113 converts the estimate of the elevation generated at operation 409 to an estimate of the building floor of wireless terminal 101, based on the particular building estimated at operation 1701 and the building-floor database constructed at operation 505 and stored in database 313. The location engine accesses in database 313 the elevation associated with the ground floor of the particular building and subtracts the ground floor elevation from the estimate of the elevation of wireless terminal 101, in order to get a non-ground height (i.e., relative to the ground floor). Location engine 113 then estimates the building floor that the non-ground height is within, based on the mapping of pressure differences to building floors constructed and stored in database 313 for the particular building. This is because the pressure difference between ground floor and terminal's floor corresponds to the non-ground height of the terminal.

In some embodiments of the present invention, location engine 113 also provides an accuracy of the building floor estimate, which is based at least in part on i) the non-ground height (e.g., assessed in terms of its closeness to adjacent floor boundaries, etc.) and ii) the accuracy of the building-floor database itself (e.g., assessed in terms of how developed it currently is, etc.).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating the building floor of a first wireless terminal, the method comprising:
   receiving, by a data processing system, a first series of M measurements of barometric pressure made by a second wireless terminal, wherein at least some of the measurements in the first series are probative of the second wireless terminal being at a first elevation within a building;
   receiving, by the data processing system, a second series of N measurements of barometric pressure made by the second wireless terminal, wherein at least some of the measurements in the second series are probative of the second wireless terminal being at a second elevation within the building;

determining a first difference between i) a first pressure-related value that is derived from at least one of the measurements in the first series that are probative of the second wireless terminal being at the first elevation and ii) a second pressure-related value that is derived from at least one of the measurements in the second series that are probative of the second wireless terminal being at the second elevation;

receiving, by the data processing system, a first measurement of barometric pressure made by the first wireless terminal;

generating an estimate of building floor on which the first wireless terminal is located, based on:
  (i) the first measurement of barometric pressure made by the first wireless terminal, and
  (ii) the first difference; and transmitting the estimate of building floor to a location-based application system.

2. The method of claim 1 further comprising:
defining, in a memory of the data processing system, a geofence around the building;
generating a series of mobile-terminated location requests (MT-LR) based on the detecting of the second wireless terminal having entered an area defined by the geofence;
wherein the first series of M measurements and the second series of N measurements are made in response to the series of MT-LRs generated.

3. The method of claim 1 wherein the first elevation is on the ground floor of the building and the second elevation is unknown to the data-processing system.

4. The method of claim 1, further comprising:
receiving, by the data processing system, a third series of P measurements of barometric pressure made by a third wireless terminal, wherein at least some of the measurements in the third series are probative of the third wireless terminal being at the first elevation within the building; and
receiving, by the data processing system, a fourth series of Q measurements of barometric pressure made by the third wireless terminal, wherein at least some of the measurements in the fourth series are probative of the third wireless terminal being at the second elevation within the building;
wherein the first pressure-related value is further derived from at least one of the measurements in the third series that are probative of the third wireless terminal being at the first elevation; and
wherein the second pressure-related value is further derived from at least one of the measurements in the fourth series that are probative of the third wireless terminal being at the second elevation.

5. The method of claim 1, further comprising:
receiving, by the data processing system, a third series of P measurements of barometric pressure made by a third wireless terminal, wherein at least some of the measurements in the third series are probative of the third wireless terminal being at the first elevation within the building;
receiving, by the data processing system, a fourth series of Q measurements of barometric pressure made by the third wireless terminal, wherein at least some of the measurements in the fourth series are probative of the third wireless terminal being at a third elevation within the building, wherein the third elevation is unknown to the data-processing system; and determining a second difference between i) a third pressure-related value that is derived from at least one of the measurements in the third series that are probative of the third wireless terminal being at the first elevation and ii) a fourth pressure-related value that is derived from at least one of the measurements in the fourth series that are probative of the third wireless terminal being at the third elevation;
wherein the estimate of building floor is further based on the second difference.

6. The method of claim 1 further comprising:
receiving, by the data processing system, location-dependent information conveyed by a radio signal exchanged between a base station and the first wireless terminal;
generating an estimate of a lateral location of the first wireless terminal based on the location-dependent information conveyed by the radio signal exchanged between the base station and the first wireless terminal; and
wherein the estimate of the building floor of the first wireless terminal is further based on (i) the estimate of the lateral location of the first wireless terminal.

7. A method of estimating the building floor of a first wireless terminal, the method comprising:
receiving, by a data processing system, a first series of M measurements of barometric pressure made by a plurality of wireless terminals, wherein i) some of the measurements in the first series are probative of a second wireless terminal being at a first elevation within a building and ii) some of the measurements in the first series are probative of a third wireless terminal being at the first elevation within the building;
receiving, by the data processing system, a second series of N measurements of barometric pressure made by the plurality of wireless terminals, wherein i) at least some of the measurements in the second series are probative of the second wireless terminal being at a second elevation within the building and ii) at least some of the measurements in the second series are probative of the third wireless terminal being at the second elevation within the building, wherein the second elevation is unknown to the data processing system;
determining a first difference between i) a first pressure-related value that is derived from at least one of the measurements in the first series that are probative of the second wireless terminal being at the first elevation and ii) a second pressure-related value that is derived from at least one of the measurements in the second series that are probative of the second wireless terminal being at the second elevation;
determining a second difference between i) a third pressure-related value that is derived from at least one of the measurements in the first series that are probative of the third wireless terminal being at the first elevation and ii) a fourth pressure-related value that is derived from at least one of the measurements in the second series that are probative of the third wireless terminal being at the second elevation;
receiving, by the data processing system, a first measurement of barometric pressure made by the first wireless terminal; and
generating an estimate of building floor on which the first wireless terminal is located, based on:
  (i) the first measurement of barometric pressure made by the first wireless terminal, (ii) the first difference, and
(iii) the second difference.

8. The method of claim 7 further comprising transmitting the estimate of building floor to a location-based application system.

9. The method of claim 7 wherein the first elevation is on the ground floor of the building.

10. The method of claim 7 wherein the estimate of building floor is further based on the median value of numbers comprising the first difference and the second difference.

11. The method of claim 7, further comprising:
receiving, by the data processing system, a third series of P measurements of barometric pressure made by a third wireless terminal, wherein at least some of the measurements in the third series are probative of the third wireless terminal being at the first elevation within the building;
receiving, by the data processing system, a fourth series of Q measurements of barometric pressure made by the third wireless terminal, wherein at least some of the measurements in the fourth series are probative of the third wireless terminal being at a third elevation within the building, wherein the third elevation is unknown to the data-processing system; and
determining a second difference between i) a third pressure-related value that is derived from at least one of the measurements in the third series that are probative of the third wireless terminal being at the first elevation and ii) a fourth pressure-related value that is derived from at least one of the measurements in the fourth series that are probative of the third wireless terminal being at the third elevation;
wherein the estimate of building floor is further based on the second difference.

12. The method of claim 7 further comprising:
receiving, by the data processing system, location-dependent information conveyed by a radio signal exchanged between a base station and the first wireless terminal;
generating an estimate of a lateral location of the first wireless terminal based on the location-dependent information conveyed by the radio signal exchanged between the base station and the first wireless terminal; and
wherein the estimate of the building floor of the first wireless terminal is further based on (i) the estimate of the lateral location of the first wireless terminal.

13. The method of claim 7 further comprising:
defining, in a memory, a geofence around the building; and
generating a series of mobile-terminated location requests (MT-LR) based on the detecting of the second wireless terminal having entered an area defined by the geofence;
wherein the receiving of the first series of M measurements of barometric pressure made by the second wireless terminal is based on the series of MT-LRs generated.

14. A method of estimating the building floor of a first wireless terminal, the method comprising:
receiving, by a data processing system, a first series of M measurements of barometric pressure made by a plurality of wireless terminals, wherein i) some of the measurements in the first series are probative of a second wireless terminal being at a first elevation within a building, ii) some of the measurements in the first series are probative of a third wireless terminal being at the first elevation within the building, and iii) some of the measurements in the first series are probative of a fourth wireless terminal being at the first elevation within the building;
receiving, by the data processing system, a second series of N measurements of barometric pressure made by the plurality of wireless terminals, wherein i) at least some of the measurements in the second series are probative of the second wireless terminal being at a second elevation within the building and ii) at least some of the measurements in the second series are probative of the third wireless terminal being at the second elevation within the building, wherein the second elevation is unknown to the data processing system;
receiving, by the data processing system, a third series of P measurements of barometric pressure made by the plurality of wireless terminals, wherein i) at least some of the measurements in the third series are probative of the fourth wireless terminal being at a third elevation within the building, wherein the third elevation is unknown to the data processing system;
determining a first difference between i) a first pressure-related value that is derived from at least one of the measurements in the first series that are probative of the second wireless terminal being at the first elevation and ii) a second pressure-related value that is derived from at least one of the measurements in the second series that are probative of the second wireless terminal being at the second elevation;
generating a second difference between i) a third pressure-related value that is derived from at least one of the measurements in the first series that are probative of the third wireless terminal being at the first elevation and ii) a fourth pressure-related value that is derived from at least one of the measurements in the second series that are probative of the third wireless terminal being at the second elevation;
generating a third difference between i) a fifth pressure-related value that is derived from at least one of the measurements in the first series that are probative of the fourth wireless terminal being at the first elevation and ii) a sixth pressure-related value that is derived from at least one of the measurements in the third series that are probative of the fourth wireless terminal being at the third elevation;
receiving, by the data processing system, a first measurement of barometric pressure made by the first wireless terminal; and
generating an estimate of building floor on which the first wireless terminal is located, based on:
(i) the first measurement of barometric pressure made by the first wireless terminal,
(ii) the first difference,
(iii) the second difference, and
(iv) the third difference.

15. The method of claim 14 further comprising transmitting the estimate of building floor to a location-based application system.

16. The method of claim 14 wherein the first elevation is on the ground floor of the building.

17. The method of claim 14 wherein the estimate of building floor is further based on the median value of numbers comprising the first difference and the second difference.

18. The method of claim 14 further comprising:
receiving, by the data processing system, location-dependent information conveyed by a radio signal exchanged between a base station and the first wireless terminal;
generating an estimate of a lateral location of the first wireless terminal based on the location-dependent information conveyed by the radio signal exchanged between the base station and the first wireless terminal; and
wherein the estimate of the building floor of the first wireless terminal is further based on (i) the estimate of the lateral location of the first wireless terminal.

19. The method of claim 14 further comprising:
defining, in a memory, a geofence around the building; and
generating a series of mobile-terminated location requests (MT-LR) based on the detecting of the second wireless terminal having entered an area defined by the geofence;
wherein the receiving of the first series of M measurements of barometric pressure made by the second wireless terminal is based on the series of MT-LRs generated.

* * * * *